US012071908B2

(12) United States Patent
Joh et al.

(10) Patent No.: US 12,071,908 B2
(45) Date of Patent: Aug. 27, 2024

(54) CONTROLLER FOR INTERNAL COMBUSTION ENGINE, CONTROL METHOD FOR INTERNAL COMBUSTION ENGINE, AND MEMORY MEDIUM

(71) Applicant: TOYOTA JIDOSHA KABUSHIKI KAISHA, Toyota (JP)

(72) Inventors: Yusuke Joh, Toyota (JP); Tomoyuki Tsuji, Nagakute (JP); Yuki Ikejiri, Nishio (JP); Masashi Hakariya, Nisshin (JP); Makoto Yamazaki, Gotemba (JP); Yoshikazu Asami, Gotemba (JP); Hisao Kiyono, Toyota (JP); Tatsuaki Arisawa, Toyota (JP); Yoshifumi Matsuda, Toyota (JP); Tsubasa Sugano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/356,376

(22) Filed: Jul. 21, 2023

(65) Prior Publication Data

US 2024/0068422 A1 Feb. 29, 2024

(30) Foreign Application Priority Data

Aug. 30, 2022 (JP) ................................ 2022-137236

(51) Int. Cl.
*F01N 9/00* (2006.01)
*F01N 11/00* (2006.01)
(Continued)

(52) U.S. Cl.
CPC ............ *F02D 41/22* (2013.01); *F01N 9/005* (2013.01); *F01N 11/002* (2013.01);
(Continued)

(58) Field of Classification Search
CPC .. F02D 41/22; F02D 41/0255; F02D 41/1446; F02D 41/221; F02D 41/0235;
(Continued)

(56) References Cited

U.S. PATENT DOCUMENTS 5,860,277 A * 1/1999 Schnaibel ............... F01N 9/005 60/276
11,047,288 B2 * 6/2021 Katoh ................. F02D 41/1446
(Continued)

FOREIGN PATENT DOCUMENTS

JP 2007-009798 A 1/2007
JP 2020-106028 A 7/2020

*Primary Examiner* — Dapinder Singh
(74) *Attorney, Agent, or Firm* — Oblon, McClelland, Maier & Neustadt, L.L.P.

(57) ABSTRACT

An upstream integrated value is an integrated value of a difference obtained by subtracting an upstream gas temperature at a starting point in time of integration from the upstream gas temperature after starting of the internal combustion engine. A downstream integrated value is an integrated value of a difference obtained by subtracting a downstream gas temperature at the starting point in time of the integration from the downstream gas temperature after the starting of the internal combustion engine. An anomaly diagnosing process obtains an anomaly determination result indicating that the exhaust purification device is in a removed state when a deviation between the upstream integrated value and the downstream integrated value is smaller than a reference level. The determination threshold is higher than a dew point.

17 Claims, 13 Drawing Sheets

(51) Int. Cl.
*F02D 41/02* (2006.01)
*F02D 41/14* (2006.01)
*F02D 41/22* (2006.01)

(52) U.S. Cl.
CPC ..... *F02D 41/0235* (2013.01); *F02D 41/0255* (2013.01); *F02D 41/1446* (2013.01); *F02D 41/221* (2013.01); *F01N 2550/00* (2013.01); *F01N 2900/00* (2013.01); *F02D 2200/0804* (2013.01)

(58) Field of Classification Search
CPC ..... F02D 2200/0802; F02D 2200/0804; F02D 2041/228; F01N 9/00; F01N 9/005; F01N 11/00; F01N 11/005; F01N 2900/00; F01N 2900/1602; F01N 2900/1811; F01N 2900/1628; F01N 2410/02; F01N 2410/03; F01N 2550/00; F01N 2560/00; F01N 2560/028; F01N 2560/06; Y02T 10/12; Y02T 10/40; Y02A 50/20
See application file for complete search history.

(56) References Cited

U.S. PATENT DOCUMENTS

| | | | | |
|---|---|---|---|---|
| 2016/0084137 | A1* | 3/2016 | Cunningham | G01K 3/00 73/114.76 |
| 2018/0283248 | A1* | 10/2018 | Upadhyay | F02D 41/1446 |
| 2018/0372011 | A1* | 12/2018 | Hagari | F01N 9/005 |
| 2020/0200108 | A1 | 6/2020 | Katoh et al. | |
| 2020/0370485 | A1 | 11/2020 | Katoh et al. | |
| 2020/0370486 | A1 | 11/2020 | Katoh et al. | |
| 2020/0370487 | A1 | 11/2020 | Katoh et al. | |
| 2020/0370488 | A1 | 11/2020 | Katoh et al. | |
| 2020/0370489 | A1 | 11/2020 | Katoh et al. | |
| 2020/0370490 | A1 | 11/2020 | Katoh et al. | |
| 2020/0370491 | A1 | 11/2020 | Katoh et al. | |
| 2020/0378325 | A1 | 12/2020 | Katoh et al. | |
| 2020/0378326 | A1 | 12/2020 | Katoh et al. | |
| 2020/0378327 | A1 | 12/2020 | Katoh et al. | |
| 2020/0400087 | A1 | 12/2020 | Katoh et al. | |
| 2022/0034251 | A1 | 2/2022 | Katoh et al. | |
| 2022/0034252 | A1 | 2/2022 | Katoh et al. | |

* cited by examiner

CONTROLLER FOR INTERNAL COMBUSTION ENGINE, CONTROL METHOD FOR INTERNAL COMBUSTION ENGINE, AND MEMORY MEDIUM

BACKGROUND

1. Field

The present disclosure relates to a controller for an internal combustion engine, a control method for an internal combustion engine, and a memory medium.

2. Description of Related Art

An exhaust purification device is provided in an exhaust passage. The heat of exhaust gas conducted into the exhaust purification device is consumed by heat exchange with the exhaust purification device. As a result, there is a difference between a change in an exhaust gas temperature on the upstream side of the exhaust purification device and a change in the exhaust gas temperature on the downstream side of the exhaust purification device.

Japanese Laid-Open Patent Publication No. 2020-106028 discloses a controller for an internal combustion engine. A filter traps particulate matter in exhaust gas. The controller detects that the filter has been removed from the exhaust passage.

The controller disclosed in this document compares a change in the exhaust gas temperature on the upstream side of the filter with a change in the exhaust gas temperature on the downstream side of the filter. Then, the controller determines whether the filter has been removed based on the difference between the change in the exhaust gas temperature on the upstream side of the filter and the change in the exhaust gas temperature on the downstream side of the filter.

Controllers for internal combustion engines, which determine anomalies by detecting situations in which an exhaust purification device, for example, has been removed from an exhaust passage, is required to make anomaly determinations with higher precision.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a controller for an internal combustion engine is employed for the internal combustion engine mounted on a vehicle. The controller includes processing circuitry that is configured to execute an integrated value calculating process and an anomaly diagnosing process. The integrated value calculating process repeatedly obtains an upstream gas temperature that indicates a temperature of exhaust gas upstream of an exhaust purification device in an exhaust passage, and a downstream gas temperature that indicates a temperature of exhaust gas downstream of the exhaust purification device. The integrated value calculating process also calculates an upstream integrated value that is an integrated value of a difference obtained by subtracting the upstream gas temperature at a starting point in time of integration from the upstream gas temperature after starting of the internal combustion engine, and a downstream integrated value that is an integrated value of a difference obtained by subtracting the downstream gas temperature at the starting point in time of the integration from the downstream gas temperature after the starting of the internal combustion engine. The anomaly diagnosing process obtains an anomaly determination result indicating that the exhaust purification device is in a removed state when a deviation between the upstream integrated value and the downstream integrated value, taken over a range ending when the downstream gas temperature becomes higher than or equal to a determination threshold, after a time since the starting of the internal combustion engine is smaller than a reference level, the determination threshold being higher than a dew point.

When the exhaust purification device is installed, the heat of the exhaust gas is consumed as the heat of vaporization of water until the water collected on the exhaust purification device evaporates. This causes changes in the downstream gas temperature to stagnate. Accordingly, the deviation between the upstream integrated value and the downstream integrated value increases until the downstream gas temperature becomes higher than or equal to the determination threshold, which is higher than the dew point.

When the exhaust purification device has been removed, heat exchange is not performed between the exhaust gas conducted into the exhaust purification device and the exhaust purification device. Thus, the increase in the downstream gas temperature does not stagnate. Accordingly, the deviation between the upstream integrated value and the downstream integrated value decreases until the downstream gas temperature becomes higher than or equal to the determination threshold, which is higher than the dew point.

Therefore, the above-described controller performs the anomaly determination with high accuracy based on the fact that the deviation between the upstream integrated value and the downstream integrated value until the downstream gas temperature becomes higher than or equal to the determination threshold, which is higher than the dew point, is smaller than the reference level.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An engine control unit 110, which is a controller for an internal combustion engine according to one embodiment, will now be described with reference to FIGS. 1 to 16. The engine control unit 110 performs a control method for an internal combustion engine and a control process for an internal combustion engine.

<Configuration of Vehicle>

Figure 1:
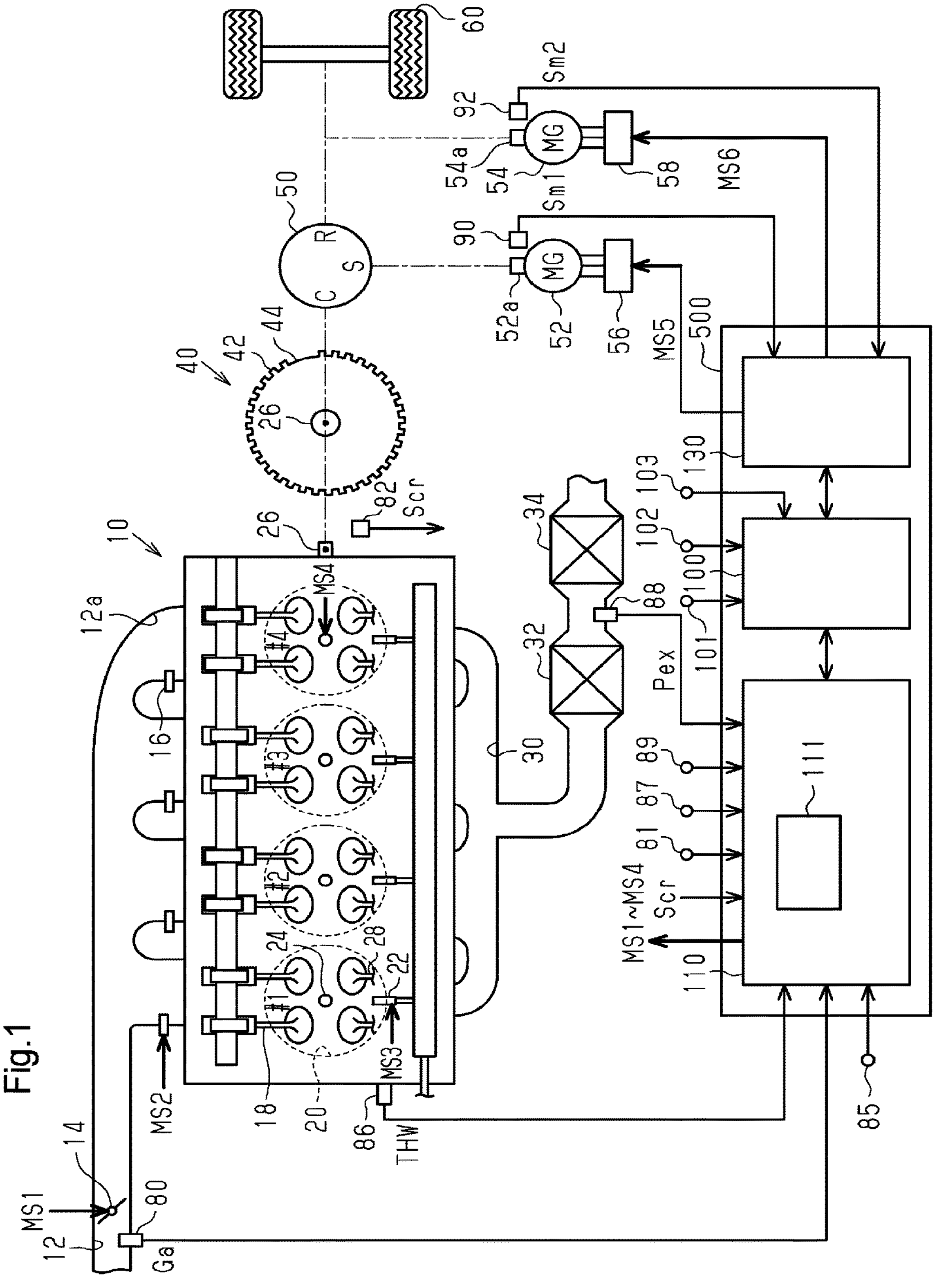
FIG. 1 is a schematic diagram showing a configuration of an engine control unit, which is a controller for an internal combustion engine according to an embodiment, an engine controlled by the engine control unit, and a hybrid electric vehicle including the engine.

As shown in FIG. 1, an engine 10 is an internal combustion engine that includes four cylinders #1 to #4. The engine 10 is mounted on a vehicle. An intake passage 12 of the engine 10 incorporates a throttle valve 14. The intake passage 12 includes intake ports 12*a* in a downstream section. Each intake port 12*a* is provided with a port injection valve 16, which injects fuel into the intake port 12*a*. Air drawn into the intake passage 12 and fuel injected from the port injection valves 16 flow into combustion chambers 20 when intake valves 18 are opened. The engine 10 is provided with direct injection valves 22, which inject fuel into the cylinders #1 to #4. The direct injection valves 22 inject fuel into the combustion chambers 20 in some cases. Air-fuel mixture in each combustion chamber 20 is burned by spark discharge of an ignition plug 24. This generates combustion energy, which is in turn converted into rotational energy of a crankshaft 26.

The air-fuel mixture burned in the combustion chambers 20 is discharged to an exhaust passage 30 as exhaust gas when exhaust valves 28 are opened. The exhaust passage 30 is provided with a three-way catalyst 32, which has an oxygen storage capacity, and a gasoline particulate filter 34 (hereinafter referred to as GPF 34). For example, the GPF 34 functions as an exhaust purification device. The GPF 34 includes a filter that traps particulate matter (PM) contained in exhaust gas, and supports a three-way catalyst.

A crank rotor 40 having thirty-two teeth 42 is coupled to the crankshaft 26. The teeth 42 are generally arranged at 10° C.A intervals on the crank rotor 40. Thus, the crank rotor 40 is provided with a toothless section 44 in which the interval between the adjacent teeth 42 is widened by two missing teeth 42. The toothless section 44 is configured to indicate a referential rotation angle of the crankshaft 26.

The crankshaft 26 is mechanically coupled to a carrier C of a planetary gear mechanism 50, which is part of a power splitter. The planetary gear mechanism 50 includes a sun gear S, which is mechanically coupled to a rotary shaft 52*a* of a first motor-generator 52. The planetary gear mechanism 50 includes a ring gear R, which is mechanically coupled to a rotary shaft 54*a* of a second motor-generator 54 and to driven wheels 60. Alternating-current voltage of an inverter 56 is applied to terminals of the first motor-generator 52. Also, alternating-current voltage of an inverter 58 is applied to terminals of the second motor-generator 54.

<Controller 500>

A controller 500 controls the engine 10, the first motor-generator 52, and the second motor-generator 54. The controller 500 includes the engine control unit 110, which controls the engine 10. The controller 500 includes a motor control unit 130, which controls the first motor-generator 52 and the second motor-generator 54. The controller 500 includes a general control unit 100, which is connected to the engine control unit 110 and the motor control unit 130 to oversee control of the vehicle. Each of these control units includes processing circuitry and a memory storing programs executed by the processing circuitry.

The controller 500 controls the engine 10, the first motor-generator 52, and the second motor-generator 54. That is, the controller 500 controls the power train of the vehicle. The controller 500 receives detection signals from sensors provided at various sections in the vehicle.

The engine control unit 110 operates operated units of the engine 10, such as the throttle valve 14, the port injection valves 16, the direct injection valves 22, and the ignition plugs 24, thereby controlling torque and the ratios of exhaust components, which are controlled variables of the engine 10.

The motor control unit 130 also operates the inverter 56, thereby controlling the rotation speed, which is a controlled variable of the first motor-generator 52. Further, the motor control unit 130 operates the inverter 58, thereby controlling torque, which is a controlled variable of the second motor-generator 54.

FIG. 1 shows operation signals MS1 to MS6 respectively corresponding to the throttle valve 14, the port injection valves 16, the direct injection valves 22, the ignition plugs 24, and the inverters 56, 58. To control controlled variables of the engine 10, the engine control unit 110 refers to an intake air amount Ga detected by an air flow meter 80 and an intake air temperature THA. The engine control unit 110 also refers to an output signal Scr of a crank angle sensor 82, a coolant temperature THW detected by a coolant temperature sensor 86, and a pressure Pex of exhaust gas flowing into the GPF 34 detected by an exhaust pressure sensor 88. The engine control unit 110 also refers to an atmospheric pressure PA detected by an atmospheric pressure sensor 85. The motor control unit 130 refers to an output signal Sm1 from a first rotation angle sensor 90, which detects a rotation angle of the first motor-generator 52, in order to control a controlled variable of the first motor-generator 52. The motor control unit 130 also refers to an output signal Sm2 from a second rotation angle sensor 92, which detects a rotation angle of the second motor-generator 54, in order to control a controlled variable of the second motor-generator 54.

Each of the engine control unit 110 and the motor control unit 130 is connected to the general control unit 100 by a communication line. The general control unit 100, the motor control unit 130, and the engine control unit 110 exchange and share calculated information and information based on detection signals from sensors through CAN communication.

The general control unit 100 is connected to an accelerator position sensor 101, a brake sensor 102, and a vehicle speed sensor 103. The accelerator position sensor 101 detects an operated amount of the accelerator. The brake sensor 102 detects an operated amount of the brake. The vehicle speed sensor 103 detects a vehicle speed SPD, which is the speed of the vehicle.

An air-fuel ratio sensor 81 is provided in the exhaust passage 30. The air-fuel ratio sensor 81 is connected to the engine control unit 110. The air-fuel ratio sensor 81 detects an air-fuel ratio.

The engine control unit 110 is connected to an upstream temperature sensor 87 for detecting an upstream gas temperature Tin, which is a temperature of exhaust gas between the three-way catalyst 32 and the GPF 34 in the exhaust passage 30. The engine control unit 110 is also connected to a downstream temperature sensor 89 for detecting a downstream gas temperature Tout, which is a temperature of exhaust gas downstream of the GPF 34.

The engine control unit 110 calculates a counter CNT, which corresponds to the crank angle, by counting the number of times that the output signal Scr of the crank angle sensor 82 has been input. The value of the counter CNT corresponds to the crank angle, and the larger the value, the larger the crank angle. When the counter CNT reaches 720° C.A, which is a value corresponding to 0° C.A, the counter CNT is reset to 0 again. The crank angle when the counter CNT is 0 is the crank angle at the compression top dead center.

<Manner in which Fuel Injection is Performed>

The engine control unit 110 changes the manner in which fuel injection is performed in the engine 10 in accordance with an engine load factor KL and an engine rotation speed NE. For example, in a high-load zone, the engine 10 supplies fuel by direct injection alone, which is fuel injection by the direct injection valves 22. In a low-load zone, the engine 10 supplies fuel by port injection alone, which is fuel injection by the port injection valves 16. The engine 10 may supply fuel by port injection and direct injection. In this case, the engine control unit 110 changes the ratio between the port injection and the direct injection in accordance with the engine load factor KL and the engine rotation speed NE. In this manner, the engine 10 prepares an air-fuel mixture suitable for combustion.

The engine rotation speed NE is calculated by the engine control unit 110 based on the output signal Scr. The engine load factor KL is calculated by the engine control unit 110 based on the intake air amount Ga and the engine rotation speed NE.

<Temperature Increase Control>

Figure 2:
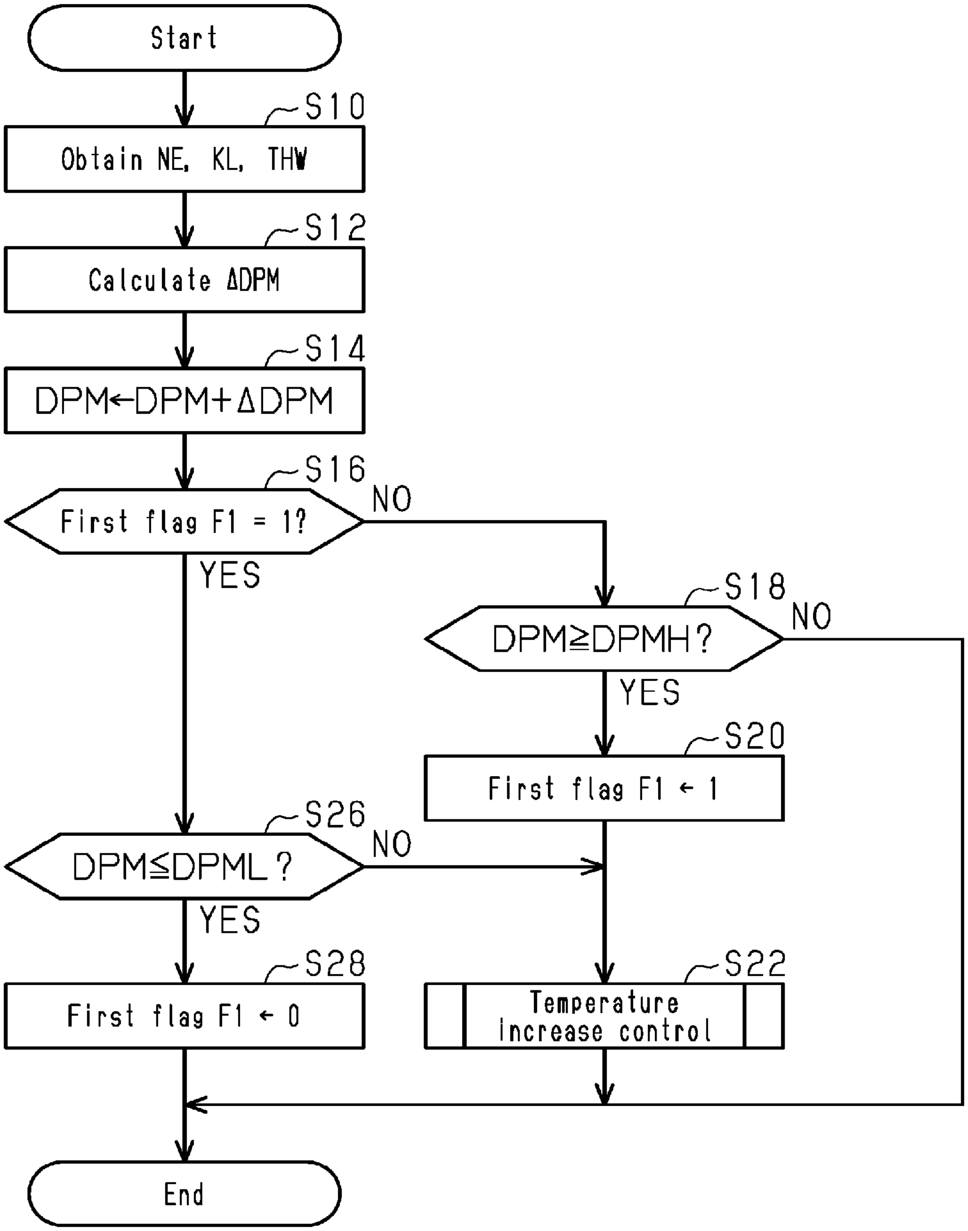
FIG. 2 is a flowchart showing the procedure of a routine related to a temperature increase control executed by the engine control unit of FIG. 1.

FIG. 2 shows a procedure in a routine related to a temperature increase control executed by the engine control unit 110. The routine shown in FIG. 2 is performed by processing circuitry 111 repeatedly executing programs stored in the memory (for example, a ROM) at a specified interval. The processing circuitry 111 stores data in a RAM when necessary.

In the routine shown in FIG. 2, the processing circuitry 111 of the engine control unit 110 first obtains the engine rotation speed NE, the engine load factor KL, and the coolant temperature THW in the process of step S10. In the process of the subsequent step S12, the processing circuitry 111 calculates an update amount ΔDPM of an accumulated amount DPM based on the engine rotation speed NE, the engine load factor KL, and the coolant temperature THW. The accumulated amount DPM is the amount of PM trapped by the GPF 34. Specifically, the processing circuitry 111 calculates the amount of PM in the exhaust gas discharged to the exhaust passage 30 based on the engine rotation speed NE, the engine load factor KL, and the coolant temperature THW. Then, the processing circuitry 111 calculates the update amount ΔDPM based on the amount of PM in the exhaust gas, the GPF temperature, the air-fuel ratio, and an execution state of the temperature increase control, which will be discussed below.

Next, in the process of step S14, the processing circuitry 111 updates the accumulated amount DPM. Specifically, the processing circuitry 111 sets a new accumulated amount DPM to a sum obtained by adding the update amount ΔDPM to the current accumulated amount DPM. The update amount ΔDPM, which is calculated through the process of step S12, may be a negative value. When the temperature of the GPF 34 is increased by the execution of the temperature increase control, which will be discussed below, PM is burned, so that the accumulated amount DPM decreases. When the update amount ΔDPM calculated by the processing circuitry 111 is a negative value, the accumulated amount DPM calculated through the process of step S14 decreases. Next, in the process of step S16, the processing circuitry 111 determines whether a first flag F1 has a value of 1. When having value of 1, the first flag F1 indicates that the execution of the temperature increase control for burning and removing the PM in the GPF 34 is requested. When having a value of 0, the first flag F1 indicates that the execution of the temperature increase control is not requested.

When determining in the process of step S16 that the first flag F1 has a value of 0 (step S16: NO), the processing circuitry 111 advances the process to step S18. Then, the processing circuitry 111 determines whether the accumulated amount DPM is greater than or equal to a temperature increase execution value DPMH in the process of step S18. The temperature increase execution value DPMH is a threshold used to determine that PM needs to be removed based on the accumulated amount DPM being greater than or equal to the temperature increase execution value DPMH.

When determining in the process of step S18 that the accumulated amount DPM is greater than or equal to the temperature increase execution value DPMH (step S18: YES), the processing circuitry 111 advances the process to step S20. Then, the processing circuitry 111 assigns 1 to the first flag F1 in the process of step S20. Then, the processing circuitry 111 advances the process to step S22. In the process of step S22, the processing circuitry 111 executes the temperature increase control. When the first flag F1 has a value of 1 and the temperature increase control is requested, the engine control unit 110 executes the temperature increase control suitable for the state at that time. The temperature increase control is a control for increasing the temperature of the exhaust purification device to remove the PM trapped in the GPF 34 through an oxidation reaction. The temperature increase control executed by the engine control unit 110 includes a first temperature increase control, in which the temperature increases more greatly (for example, faster), and a second temperature increase control, in which the degree of temperature increase is less than that in the first temperature increase control.

Examples of the first temperature increase control include a fuel cutoff operation injection, in which unburned fuel is delivered to the exhaust purification device (34) by injecting fuel during a fuel cutoff operation. When oxygen and fuel are supplied to the exhaust purification device (34) by the fuel cutoff operation injection, the reaction heat of oxidation reaction increases the temperature of the exhaust purification device (34). When the exhaust purification device (34) is at a high temperature and is being supplied with oxygen in this manner, the PM trapped by the GPF 34 is oxidized and removed. Examples of the first temperature increase control also include a stopping process, which stops fuel supply to some cylinders (for example, #1) of the cylinders of the engine 10 and supplies fuel to the remaining cylinders (for example, #2 to #4). At this time, the air-fuel ratio in the cylinders to which fuel is supplied is made richer than the stoichiometric air-fuel ratio. This causes exhaust gas containing unburned fuel to be discharged from the cylinders to which fuel is being supplied. Air is discharged from the cylinder to which the fuel supply is stopped. As a result, oxygen and fuel are supplied to the exhaust purification device (34), so that the temperature of the exhaust purification device (34) increases.

Examples of the second temperature increase control include a lean air-fuel ratio control. In the lean air-fuel ratio control, the engine 10 is operated in a state in which the air-fuel ratio is leaner than the stoichiometric air-fuel ratio to reduce the heat of vaporization of the fuel, thereby increasing the temperature of the exhaust gas flowing into the exhaust purification device (34). When the high-temperature exhaust gas flows into the exhaust purification device (34), the temperature of the exhaust purification device (34) increases. Examples of the second temperature increase control include a retardation control. In the retardation control, the ignition timing is retarded to slow down combustion in the combustion chambers 20, thereby increasing the temperature of the exhaust gas flowing into the exhaust purification device (34).

A dither control can also be executed as the temperature increase control. In the dither control, some of the cylinders are designated as rich cylinders, and the remaining cylinders are designated as lean cylinders. In the rich cylinders, combustion is performed at an air-fuel ratio lower than the stoichiometric air-fuel ratio. In the lean cylinders, combustion is performed at an air-fuel ratio higher than the stoichiometric air-fuel ratio. As a result, the exhaust gas of the lean cylinders, which contains a relatively large amount of excess oxygen, and the exhaust gas of the rich cylinder, which contains a relatively large amount of unburned fuel, alternately flow into the exhaust purification device (34). This increases the temperature of the exhaust purification device (34). If the difference between the fuel injection amount to the rich cylinders and the fuel injection amount to the lean cylinders is increased, the dither control is the first temperature increase control, in which the degree of the temperature increase is relatively high. If the difference between the fuel injection amount to the rich cylinders and the fuel injection amount to the lean cylinders is reduced, the dither control is the second temperature increase control, in which the degree of the temperature increase is relatively low.

In this manner, in the process of step S22, the processing circuitry 111, having executed the temperature increase control suitable for the state at that time, temporarily suspends the routine.

On the other hand, in the process of step S18, when determining that the accumulated amount DPM is less than the temperature increase execution value DPMH (step S18: NO), the processing circuitry 111 does not execute the processes of step S20 and step S28 and temporarily suspends the routine.

When determining in the process of step S16 that the first flag F1 has a value of 1 (step S16: YES), the processing circuitry 111 advances the process to step S26. Then, the processing circuitry 111 determines whether the accumulated amount DPM is less than or equal to a stopping threshold DPML in the process of step S26. The stopping threshold DPML is a threshold for determining that the temperature increase control may be stopped based on the accumulated amount DPM being less than or equal to the stopping threshold DPML.

When determining in the process of step S26 that the accumulated amount DPM is less than or equal to the stopping threshold DPML (step S26: YES), the processing circuitry 111 advances the process to step S28. In step S28, the processing circuitry 111 assigns 0 to the first flag F1 to stop the temperature increase control. Then, the processing circuitry 111 temporarily suspends this routine.

<Principle of Anomaly Diagnosing Process>

If the exhaust purification device (34) is removed from the exhaust passage 30, the exhaust gas cannot be purified. Therefore, when detecting that the exhaust purification device (34) is in a state of being removed from the exhaust passage 30, the engine control unit 110 executes an anomaly diagnosing process that obtains an anomaly determination result indicating that the exhaust purification device (34) is in a state of being removed from the exhaust passage 30.

Figure 3:
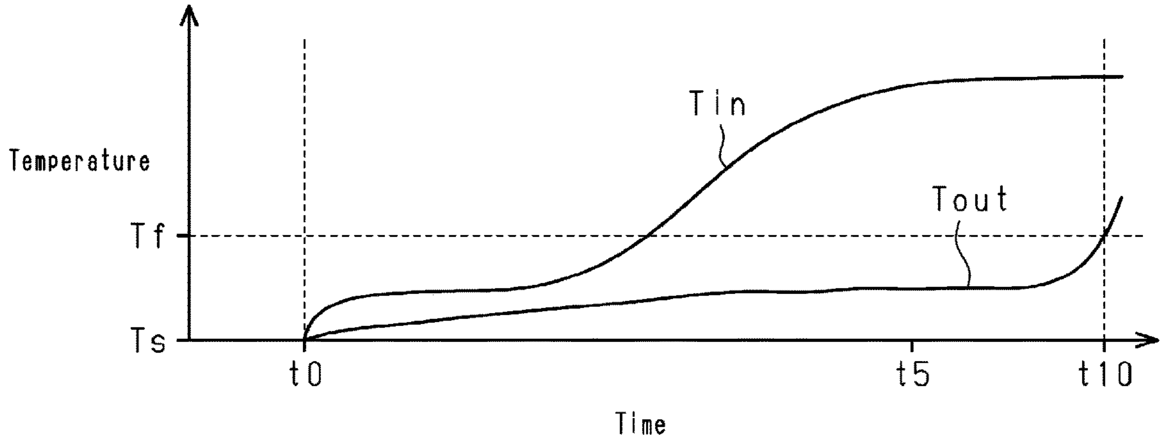
FIG. 3 is a graph showing trends of an upstream gas temperature and a downstream gas temperature in a case in which an exhaust purification device is installed in an exhaust passage of FIG. 1.

FIG. 3 shows trends of an upstream gas temperature Tin and a downstream gas temperature Tout from completion of starting of the engine 10. In FIG. 3, the upstream gas temperature Tin and the downstream gas temperature Tout obtained at point in time t0, at which the starting is completed and the operation of the engine 10 starts operating, are each indicated as a start-time temperature Ts. The start-time temperature Ts of the upstream gas temperature Tin is a start-time upstream gas temperature Ts_in. That is, the start-time upstream gas temperature Ts_in is the upstream gas temperature Tin obtained at point in time t0. FIG. 3 shows trends of the upstream gas temperature Tin with the start-time upstream gas temperature Ts_in being the origin. The start-time temperature Ts of the downstream gas temperature Tout is a start-time upstream gas temperature Ts_out. That is, the start-time downstream gas temperature Ts_out is the downstream gas temperature Tin obtained at point in time t0. FIG. 3 shows trends of the downstream gas temperature Tout with the start-time downstream gas temperature Ts_out being the origin.

FIG. 3 shows trends of the upstream gas temperature Tin and the downstream gas temperature Tout after a cold start in a normal state, in which the exhaust purification device (34) is installed in the exhaust passage 30. The cold start is a start from a state in which the engine 10 is cooled to a temperature corresponding to the outside air temperature. In this case, as shown in FIG. 3, the upstream gas temperature Tin rapidly increases, whereas the downstream gas temperature Tout does not increase as rapidly as the upstream gas temperature Tin. This is because, in the cold state, water contained in exhaust gas condenses, and the condensed water collects on the exhaust purification device (34). As the temperature of the exhaust gas increases due to the start of the operation of the engine 10, the upstream gas temperature Tin increases. In contrast, until the water evaporates, the heat of the exhaust gas passing through the exhaust purification device (34) is consumed as the heat of vaporization of water. The downstream gas temperature Tout thus does not increase rapidly. In other words, the increase in the downstream gas temperature Tout stagnates until the vaporization of water in the exhaust purification device (34) proceeds. When the water completely evaporates, the temperature of the exhaust purification device (34) and the downstream gas temperature Tout increase.

Figure 4:
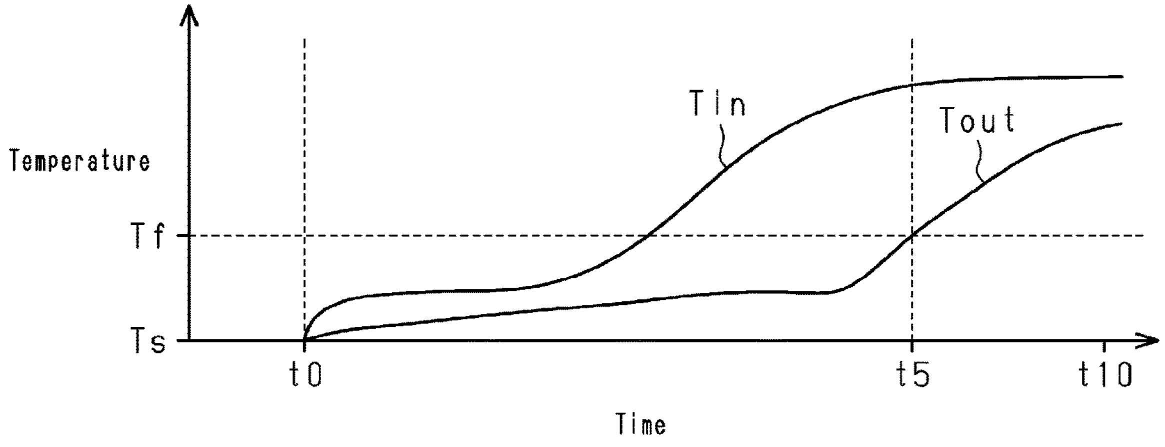
FIG. 4 is a graph showing trends of in the upstream gas temperature and the downstream gas temperature in a case in which the exhaust purification device has been removed from the exhaust passage of FIG. 1.

FIG. 4 shows trends of the upstream gas temperature Tin and the downstream gas temperature Tout after a cold start in an anomaly state, in which the exhaust purification device (34) has been removed from the exhaust passage 30. Like FIG. 3, FIG. 4 shows trends of the upstream gas temperature Tin with the start-time upstream gas temperature Ts_in being the origin. Also, like FIG. 3, FIG. 4 shows trends of the downstream gas temperature Tout with the start-time downstream gas temperature Ts_out being the origin. The trend of the upstream gas temperature Tin in FIG. 4 is the same as that in the case of FIG. 3. However, in the case of FIG. 4, since the exhaust purification device (34) has been removed from the exhaust passage 30, the stagnation of the increase in the downstream gas temperature Tout caused by the exhaust gas passing through the exhaust purification device (34) as shown in FIG. 3 does not occur. Accordingly, the downstream gas temperature Tout in FIG. 4 starts increasing from an earlier point in time than in the case of FIG. 3. Not only the heat of vaporization but also the heat capacity of the exhaust purification device (34), i.e., the amount of heat of the three-way catalyst 32 and the thermal capacity of the GPF 34 are related to the stagnation of the increase in the downstream gas temperature Tout that occurs when the exhaust purification device (34) is installed in the exhaust passage 30.

The engine control unit 110 executes an anomaly diagnosing process for obtaining an anomaly determination result indicating that the exhaust purification device (34) has been removed from the exhaust passage 30 by using difference in trends of the downstream gas temperature Tout, which varies based on whether the exhaust purification device (34) is present. Specifically, the engine control unit 110 repeatedly calculates a difference obtained by subtracting the start-time upstream gas temperature Ts_in from the upstream gas temperature Tin. Then, the engine control unit 110 calculates an upstream integrated value ΣΔTin, which is an integrated value of the difference after the starting of the engine 10. Point in time t0 is an integration starting point in time, at which integration for the upstream integrated value ΣΔTin is started. Similarly, the engine control unit 110 repeatedly calculates a difference obtained by subtracting the start-time downstream gas temperature Ts_out from the downstream gas temperature Tout. Then, the engine control unit 110 calculates a downstream integrated value ΣΔTout, which is an integrated value of the difference after the starting of the engine 10. The engine control unit 110 calculates the upstream integrated value ΣΔTin and the downstream integrated value ΣΔTout until the downstream gas temperature Tout reaches a determination threshold Tf. When the deviation between the upstream integrated value ΣΔTin and the downstream integrated value ΣΔTout is smaller than a reference level, the anomaly determination is performed. The determination threshold Tf is set to a temperature higher than the dew point.

As shown in FIG. 4, when the exhaust purification device (34) has been removed from the exhaust passage 30, the downstream gas temperature Tout reaches the determination threshold Tf at point in time t5. In contrast, as shown in FIG. 3, when the exhaust purification device (34) is installed in the exhaust passage 30, the downstream gas temperature Tout reaches the determination threshold Tf at point in time t10, which is after point in time t5.

In FIGS. 3 and 4, the upstream integrated value ΣΔTin, which is used in the anomaly diagnosing process, corresponds to the area between the start-time upstream gas temperature Ts_in and the upstream gas temperature Tin until the downstream gas temperature Tout reaches the determination threshold Tf. Also, in FIGS. 3 and 4, the downstream integrated value ΣΔTout, which is used in the anomaly diagnosing process, corresponds to the area between the start-time downstream gas temperature Ts_out and the downstream gas temperature Tout until the downstream gas temperature Tout reaches the determination threshold Tf. As is apparent from a comparison between FIGS. 3 and 4, the deviation between the upstream integrated value ΣΔTin and the downstream integrated value ΣΔTout is smaller when the exhaust purification device (34) has been removed from the exhaust passage 30 (FIG. 4) than when the exhaust purification device (34) is installed in the exhaust passage 30 (FIG. 3).

Figure 12:
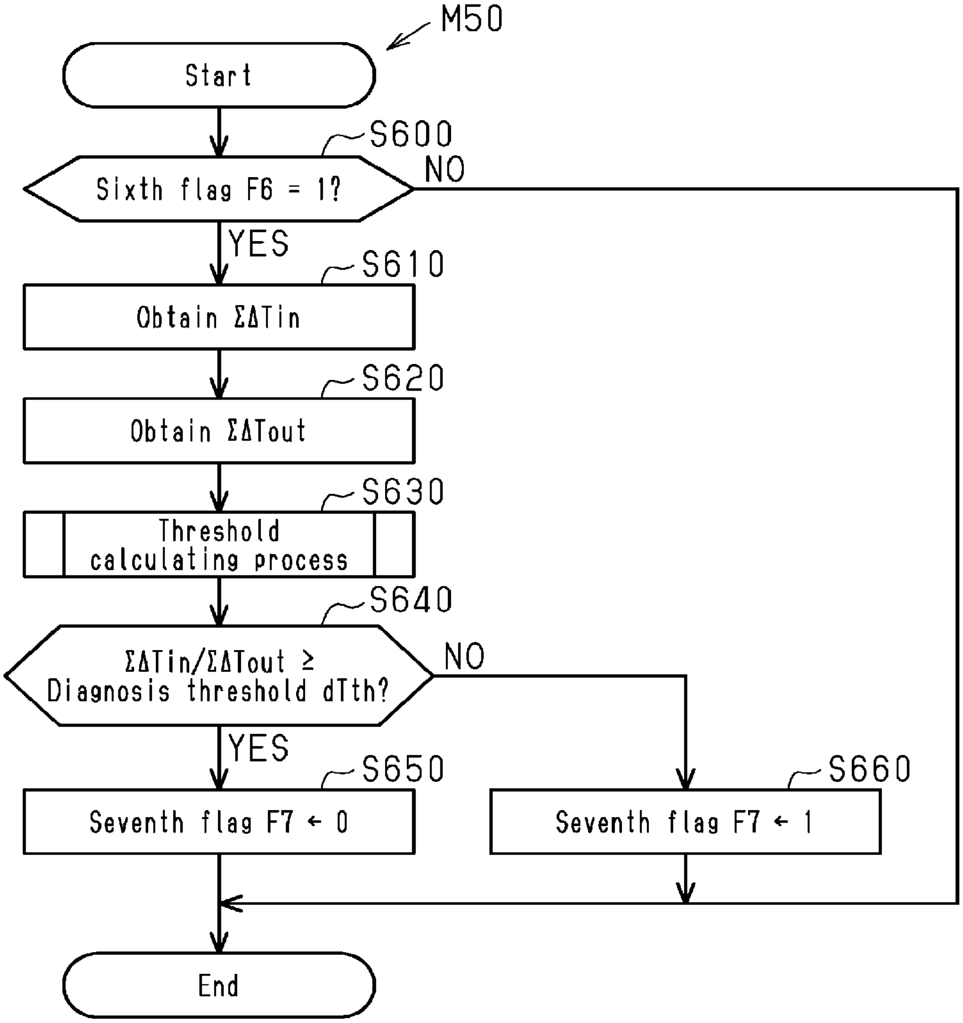
FIG. 12 is a flowchart showing a routine related to an anomaly diagnosing process M50 shown in FIG. 5.

Therefore, in the anomaly diagnosing process, the engine control unit 110 obtains an anomaly determination result when the quotient obtained by dividing the upstream integrated value ΣΔTin by the downstream integrated value ΣΔTout is smaller than a diagnosis threshold dTth (for example, step S640 in FIG. 12).

Next, a series of processes executed to diagnose an anomaly that the exhaust purification device (34) has been removed from the exhaust passage 30 will be described.

<Various Processes Related to Anomaly Diagnosis (M10 to M70) and Relationship Between Processes>

Figure 5:
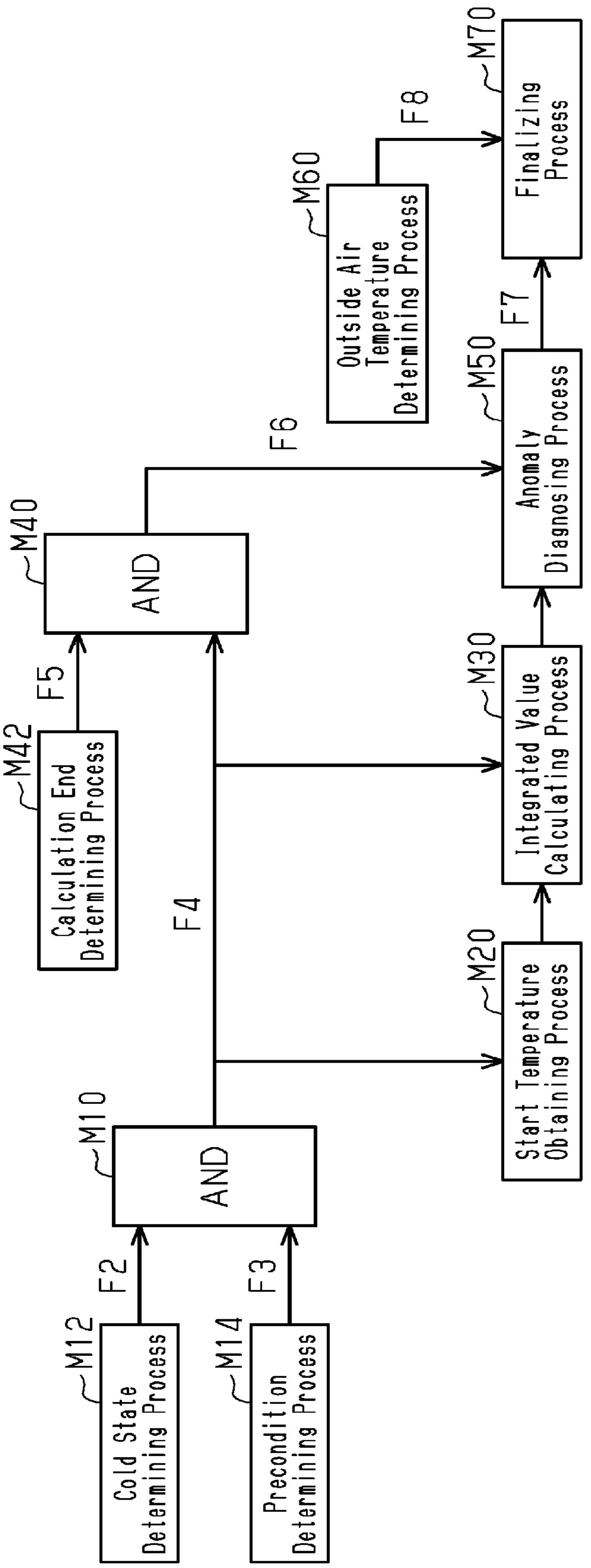
FIG. 5 is a block diagram showing a relationship between processes related to anomaly diagnosis by the engine control unit of FIG. 1.

As shown in FIG. 5, the engine control unit 110 executes a start temperature obtaining process M20 and an integrated value calculating process M30 on a condition that it is determined in a calculation condition determining process M10 that the calculation condition is met. The calculation condition is a logical conjunction condition of the following two conditions.

The first condition is that the cold state determination is made in the cold state determining process M12.

The second condition is that all the other preconditions are determined to be met in a precondition determining process M14.

The calculation condition is met when the cold state determination is made and all the other preconditions are met. The start temperature obtaining process M20 is a process of obtaining the start temperature Ts of the upstream gas temperature Tin and the downstream gas temperature Tout. The integrated value calculating process M30 is a process that calculates the upstream integrated value ΣΔTin and the downstream integrated value ΣΔTout.

When determining that the execution condition is met in an execution condition determining process M40, the engine control unit 110 executes an anomaly diagnosing process M50. The execution condition is a logical conjunction condition of the following two conditions.

The first condition is that a calculation condition is determined to be met in the calculation condition determining process M10.

The second condition is that a calculation end condition is determined to be met through a calculation end determining process M42.

In the calculation end determining process M42, the engine control unit 110 determines that the calculation end condition is met when the downstream gas temperature Tout is higher than or equal to the determination threshold Tf.

As described above, the anomaly diagnosing process M50 makes an anomaly determination when the deviation between the upstream integrated value ΣΔTin and the downstream integrated value ΣΔTout is smaller than the reference level. Even when the anomaly determination result is obtained in the anomaly diagnosing process M50, the engine control unit 110 does not immediately finalize the result of the anomaly diagnostic. The engine control unit 110 determines whether the result of the anomaly determination performed by the anomaly determining process M50 is reliable through the outside air temperature determining process M60. Then, in the finalizing process M70, the engine control unit 110 determines whether to finalize the result of the anomaly diagnosis based on the determination result of the outside air temperature determining process M60. When the result of the anomaly diagnosis is finalized in the finalizing process M70, the engine control unit 110 outputs the finalized result.

In the outside air temperature determination process M60, the engine control unit 110 estimates the outside air temperature based on the intake air temperature THA to determine whether a sufficient soak time tsoak has been secured. That is, the engine control unit 110 uses an outside air temperature estimated value based on the intake air temperature THA to determine whether the result of the anomaly diagnostic was made by the appropriate anomaly diagnosing process M50 performed after the engine was started from the cold state.

<Gas Temperature Updating Process>

When in an activated state, the engine control unit 110 repeatedly executes a gas temperature updating process in order to execute various processes (M10 to M70). The gas temperature updating process is implemented by the processing circuitry 111 executing a program stored in the memory of the engine control unit 110.

Figure 6:
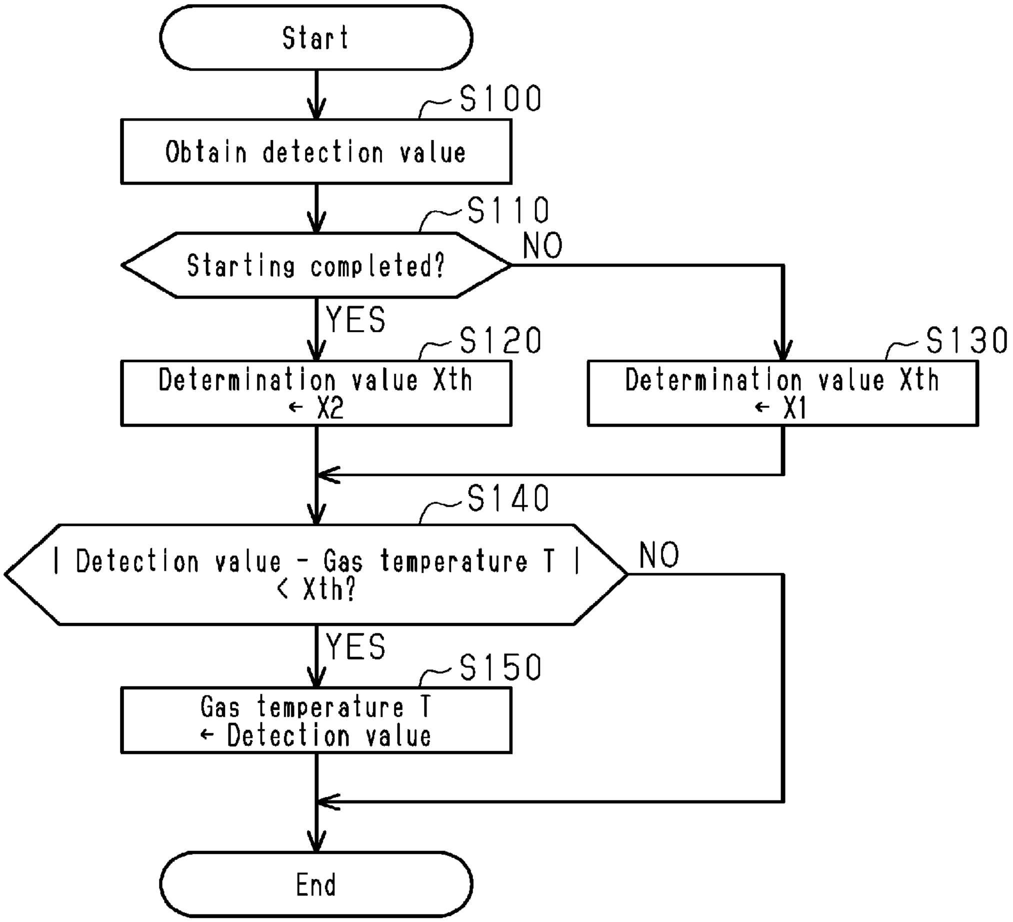
FIG. 6 is a flowchart showing a routine related to a gas temperature updating process by the engine control unit shown in FIG. 1.

FIG. 6 is a flowchart showing a routine related to the gas temperature updating process. When the routine shown in FIG. 6 is started, the processing circuitry 111 first obtains a detection value of the upstream temperature sensor 87 and a detection value of the downstream-temperature sensor 89 in step S100. Next, in the process of step S110, the processing circuitry 111 determines whether starting of the engine 10 has been completed.

When determining in the process of step S110 that the engine 10 has not been started yet (step S110: NO), the processing circuitry 111 advances the process to step S130. Then, in the process of step S130, the processing circuitry 111 assigns a first determination value X1 to a determination value Xth. When determining in the process of step S110 that starting of the engine 10 has been completed (step S110: YES), the processing circuitry 111 advances the process to step S120. Then, in the process of step S120, the processing circuitry 111 assigns a second determination value X2 to the determination value Xth. The second determination value X2 is greater than the first determination value X1 (X1<X2).

When the determination value Xth is set through the process of step S120 or step S130, the processing circuitry 111 advances the process to step S140. In the process of step S140, the processing circuitry 111 determines whether the absolute value of a difference obtained by subtracting a gas temperature T from the detection value is less than the determination value Xth. When determining that the absolute value of the difference is less than the determination value Xth (step S150: YES), the processing circuitry 111 advances the process to step S150. Then, the processing circuitry 111 updates the gas temperature T by assigning the detection value to the gas temperature T in the process of step S150. When determining that the absolute value of the difference is greater than or equal to the determination value Xth (step S150: NO), the processing circuitry 111 temporarily suspends the routine without executing the process of step S150.

The gas temperature T is the upstream gas temperature Tin or the downstream gas temperature Tout. When the detection value of the upstream temperature sensor 87 deviates from the upstream gas temperature Tin by an amount greater than or equal to the determination value Xth, the processing circuitry 111 does not reflect the detection value in the upstream gas temperature Tin. Also, when the detection value of the downstream temperature sensor 89 deviates from the downstream gas temperature Tout by an amount greater than or equal to the determination value Xth, the processing circuitry 111 does not reflect the detection value in the downstream gas temperature Tout.

The gas temperature updating process updates the gas temperature T to a value equal to the detection value detected by the temperature sensor (87, 89) on a condition that the deviation between the detection value and the previously obtained gas temperature T (Tin, Tout) is smaller than the determination value Xth. In this manner, the engine control unit 110 suppresses the influence of noise on the gas temperature T through the gas temperature updating process.

<Updating Process>

The engine control unit 110 repeatedly executes an updating process that updates other values necessary for executing various processes (M10 to M70). This updating process is also implemented by the processing circuitry 111 executing a program stored in the memory of the engine control unit 110.

In the updating process, the processing circuitry 111 updates a first accumulated time Σt1, a second accumulated time Σt2, a high-load integrated air amount ΣGA, and a minimum intake air temperature Tmin. The first accumulated time Σt1 is an accumulated execution time of the first temperature increase control in a trip from when the main switch of the vehicle is turned on to when the main switch is turned off. In other words, one trip is from when the system of the vehicle is activated to when it is stopped. The second accumulated time Σt2 is an accumulated execution time of the second temperature increase control in the trip. The high-load integrated air amount ΣGA is an integrated value of the intake air amount Ga during a high-load operation in the trip. When the intake air amount Ga is greater than or equal to a predetermined value, the processing circuitry 111 updates the high-load integrated air amount ΣGA by integrating the intake air amount Ga. The minimum intake air temperature Tmin is a minimum value of the intake air temperature THA in the trip. Each time the intake air temperature THA falls below the minimum intake air temperature Tmin, the processing circuitry 111 assigns the intake air temperature THA at that time to the minimum intake air temperature Tmin to update the minimum intake air temperature Tmin.

<Cold State Determining Process M12>

Figure 7:
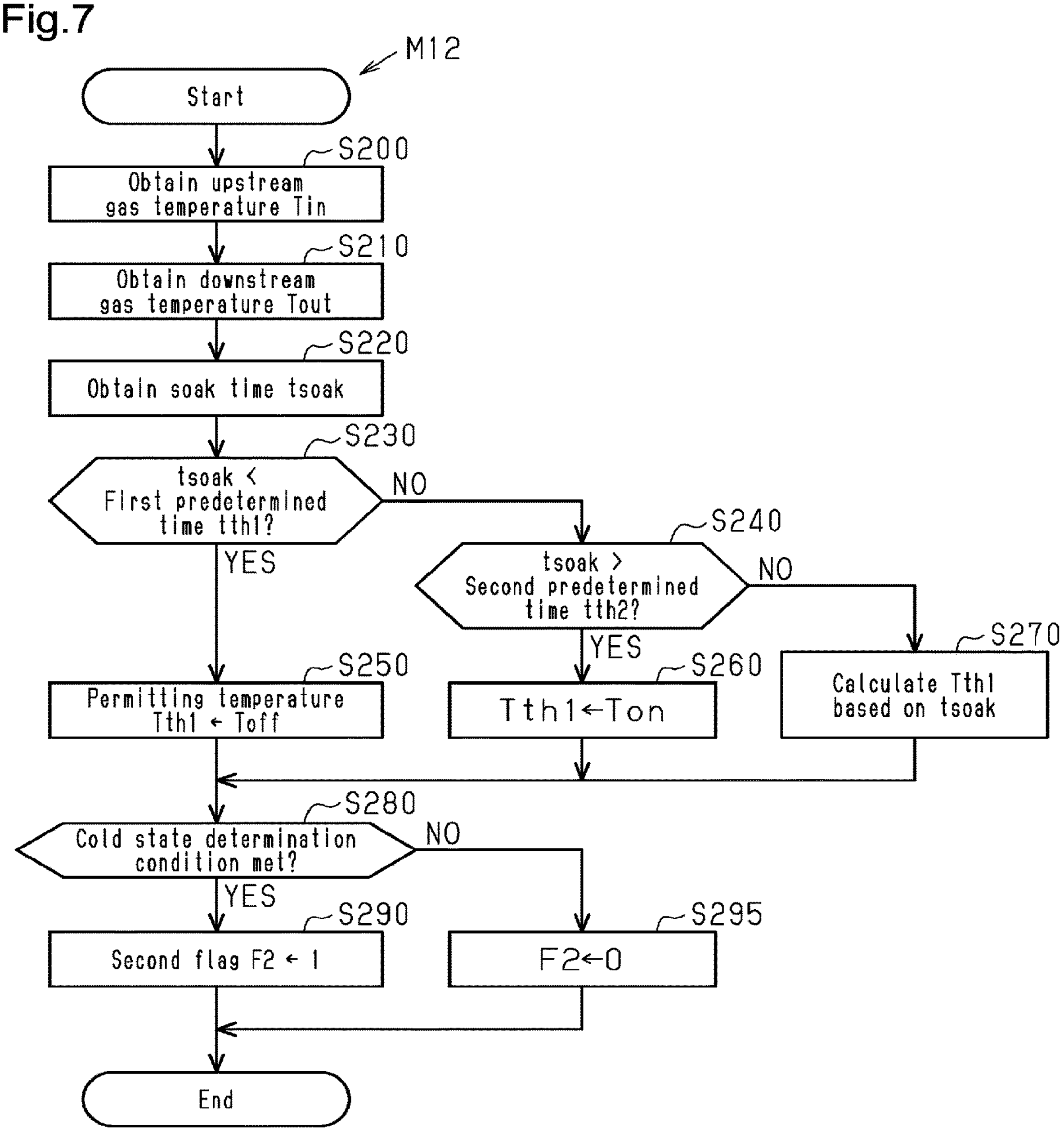
FIG. 7 is a flowchart showing a routine related to a cold state determining process M12 shown in FIG. 5.

FIG. 7 is a flowchart showing a routine related to a cold state determining process M12. The routine shown in FIG. 7 is performed by the processing circuitry 111 executing programs stored in the memory. The processing circuitry 111 executes this routine only once during one trip from when the main switch of the vehicle is turned on to when it is turned off. The processing circuitry 111 executes this routine when the engine control unit 110 is activated so that the engine 10 is started for the first time in the trip.

As shown in FIG. 7, when this routine is started, the processing circuitry 111 first obtains the upstream gas temperature Tin in the process of step S200. Next, the processing circuitry 111 obtains the downstream gas temperature Tout in the process of step S210. Then, the processing circuitry 111 obtains the soak time tsoak in the process of step S220. The soak time tsoak is a time during which the operation of the engine control unit 110 is stopped. For example, the soak time tsoak is a time from when the main switch of the vehicle is turned off to when it is turned on.

In the process of step S230, the processing circuitry 111 determines whether the soak time tsoak is shorter than a first predetermined time tth1. The first predetermined time tth1 is a threshold used to determine whether the soak time tsoak is insufficient to determine a cold state. The magnitude of the first predetermined time tth1 is set to determine the soak time tsoak to be insufficient based on the soak time tsoak being shorter than the first predetermined time tth1.

When determining in the process of step S230 that the soak time tsoak is shorter than the first predetermined time tth1 (step S230: YES), the processing circuitry 111 advances the process to step S250. Then, the processing circuitry 111 assigns a prohibition value Toff to a permitting temperature Tth1 in the process of step S250. For example, the prohibition value Toff is a value less than the lower limit value of the range of the value of the upstream gas temperature Tin.

When determining in the process of step S230 that the soak time tsoak is longer than or equal to the first predetermined time tth1 (step S230: NO), the processing circuitry 111 advances the process to step S240. In the process of step S240, the processing circuitry 111 determines whether the soak time tsoak is longer (greater) than a second predetermined time tth2. The second predetermined time tth2 is a threshold used to determine whether the soak time tsoak is long enough to determine that the vehicle is in a cold state. The magnitude of the second predetermined time tth2 is set to determine the soak time tsoak to be sufficiently long based on the soak time tsoak being longer than the second predetermined time tth2.

When determining in the process of step S240 that the soak time tsoak is longer than the second predetermined time tth2 (step S240: YES), the processing circuitry 111 advances the process to step S260. In the process of step S260, the processing circuitry 111 assigns a permitting value Ton to the permitting temperature Tth1. The permitting value Ton is greater than the upper limit value of the range of the value of the upstream gas temperature Tin.

When determining in the process of step S240 that the soak time tsoak is shorter than or equal to the second predetermined time tth2 (step S240: NO), the processing circuitry 111 advances the process to step S270. In the process of step S270, the processing circuitry 111 calculates and sets the permitting temperature Tth1 based on the soak time tsoak. A manner of calculating the permitting temperature Tth1 in the process of step S270 will be described below with reference to FIG. 8. After setting the permitting temperature Tth1 by executing the process of step S250, the process of step S260, or the process of step S270, the processing circuitry 111 advances the process to step S280.

In the process of step S280, the processing circuitry 111 determines whether a cold state determination condition is met. The cold state determination condition is a logical conjunction condition of the following three conditions.

The first condition is that the deviation between the upstream gas temperature Tin and the downstream gas temperature Tout is smaller than a predetermined level.

The second condition is that the upstream gas temperature Tin is lower than the permitting temperature Tth1.

The third condition is that the downstream gas temperature Tout is lower than a predetermined cold state determination value.

The cold state determination value is set to a value lower than 50° C., for example.

Figure 8:
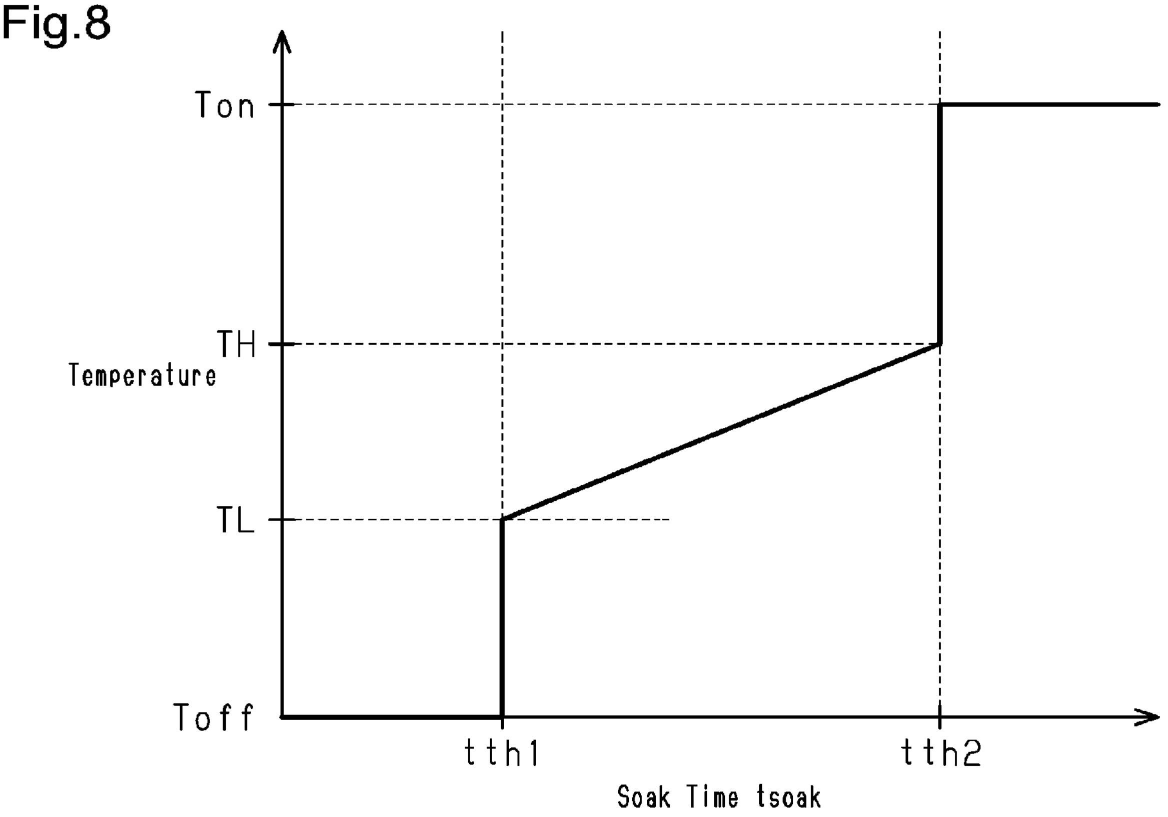
FIG. 8 is a graph showing a relationship between a soak time and a permitting temperature in the process of FIG. 7.

FIG. 8 shows a relationship between the soak time tsoak and the permitting temperature Tth1, which has been set through the process of steps S230 to S270.

As shown in FIG. 8, when the soak time tsoak is shorter than the first predetermined time tth1, the permitting temperature Tth1 is set to the prohibition value Toff. As described above, the prohibition value Toff is a value less than the lower limit value of the range of the value of the upstream gas temperature Tin. Thus, when the soak time tsoak is shorter than the first predetermined time tth1, the upstream gas temperature Tin will not fall below the permitting temperature Tth1. Therefore, when the soak time tsoak is shorter than the first predetermined time tth1, the second condition is not met. Accordingly, the cold state determination condition is not met.

When the soak time tsoak is longer than the second predetermined time tth2, the permitting temperature Tth1 is set to the permitting value Ton. As described above, the permitting value Ton is greater than the upper limit value of the range of the value of the upstream gas temperature Tin. Thus, when the soak time tsoak is longer than the second predetermined time tth2, the upstream gas temperature Tin will fall below the permitting temperature Tth1. Therefore, when the soak time tsoak is longer than the second predetermined time tth2, the cold state determination condition will be met if the other two conditions are met.

When the soak time tsoak is longer than or equal to the first predetermined time tth1 and shorter than or equal to the second predetermined time tth2, the processing circuitry 111 calculates the permitting temperature Tth1 based on the soak time tsoak in the process of step S270, as described above. As shown in FIG. 8, the processing circuitry 111 sets the permitting temperature Tth1 to a larger value as the soak time tsoak is extended. In the example shown in FIG. 8, the permitting temperature Tth1 has a value TL when the soak time tsoak is the first predetermined time tth1, and has a value TH, which is higher than TL, when the soak time tsoak is the second predetermined time tth2. In this manner the longer the soak time tsoak, the higher the permitting temperature Tth1 is set to be. Accordingly, the longer the soak time tsoak longer, the more likely the cold determination condition is to be met.

When determining in the process of step S280 that the cold state determination condition is met (step S280: YES), the processing circuitry 111 advances the process to step S290.

In the process of step S290, the processing circuitry 111 assigns 1 to a second flag F2 to indicate that the engine 10 at the time of starting is in a cold state. When having a value of 1, the second flag F2 indicates that the engine 10 has been determined to be in a cold state at the time of starting. When having a value of 0, the second flag F2 indicates that the engine 10 has not been determined to be in a cold state at the time of starting.

When determining in the process of step S280 that the cold state determination condition is not met (step S280: NO), the processing circuitry 111 advances the process to step S295. In the process of step S295, the processing circuitry 111 assigns 0 to the second flag F2 to indicate that the engine 10 at the time of starting is not in a cold state.

After setting the second flag F2 through the process of step S290 or step S295 in the above-describe manner, the processing circuitry 111 ends the routine of the cold state determining process M12 shown in FIG. 7.

<Precondition Determining Process M14>

Referring back to FIG. 5, the processing circuitry 111 repeatedly executes the precondition determining process M14 while the engine control unit 110 is operating as a result of the main switch of the vehicle being turned on. In the precondition determining process M14, the processing circuitry 111 determines whether a precondition is met. The precondition is a logical conjunction condition of the following nine conditions.

The first condition is that the upstream temperature sensor 87 and the downstream temperature sensor 89 are normal.

The second is that the intake air temperature THA is higher than or equal to an extremely low temperature determination intake air temperature (for example, −15° C.).

The third condition is that the coolant temperature THW at the time of starting of the engine 10 is higher than or equal to an extremely low temperature determination coolant temperature (for example, −15° C.).

The fourth condition is that the atmospheric pressure PA is higher than or equal to a high altitude determination value. In other words, it is a condition that the current position is not at a high altitude.

The fifth condition is that the battery is not diagnosed to be a low voltage state.

The sixth condition is that the coolant temperature THW is within a specified range (for example, range of −25° C. to 65° C.).

The seventh condition is that the integrated value of the intake air amount Ga is less than a specified value.

The eighth condition is that the accumulated time of a fuel cutoff operation is shorter than a specified value.

The ninth condition is that increases in the upstream gas temperature Tin and the downstream gas temperature Tout are not unstable.

The processing circuitry 111 assigns 1 to a third flag F3 when the nine conditions are all met, that is, when the preconditions are determined to be met. When having a value of 1, the third flag F3 indicates that the precondition is met. When having a value of 0, the third flag F3 indicates that the precondition is not met. When determining that the precondition is not met, the processing circuitry 111 assigns 0 to third flag F3.

When the precondition ceases to be met after being met, the processing circuitry 111 does not execute the precondition determining process M14 thereafter in the trip. That is, when the precondition ceases to be met after being met, the third flag F3 will not have a value of 1 thereafter in that trip. Specifically, if the calculation condition ceases to be met after being met, the engine control unit 110 does not execute, in that trip, the calculation condition determining process M10 or the integrated value calculating process M30 thereafter, and does not execute the anomaly diagnosing process M50.

<Calculation Condition Determining Process M10>

As shown in FIG. 5, the processing circuitry 111 repeatedly executes the calculation condition determining process M10 while the engine control unit 110 is operating as a result of the main switch of the vehicle being turned on. In the calculation condition determining process M10, the processing circuitry 111 determines whether a calculation condition is met. Specifically, in the calculation condition determining process M10, the processing circuitry 111 obtains the second flag F2 and the third flag F3, and determines that the calculation condition is met when the second flag F2 and the third flag F3 both have a value of 1. When at least one of the second flag F2 and the third flag F3 has a value of 0, the processing circuitry 111 determines that the calculation condition is not met.

When determining that the calculation condition is met, the processing circuitry 111 assigns 1 to a fourth flag F4. When determining that the calculation condition is not met, the processing circuitry 111 assigns 0 to the fourth flag F4. When having a value of 1, the fourth flag F4 indicates that the calculation condition is met. When having a value of 0, the fourth flag F4 indicates that the calculation condition is not met.

<Start Temperature Obtaining Process M20>

Figure 9:
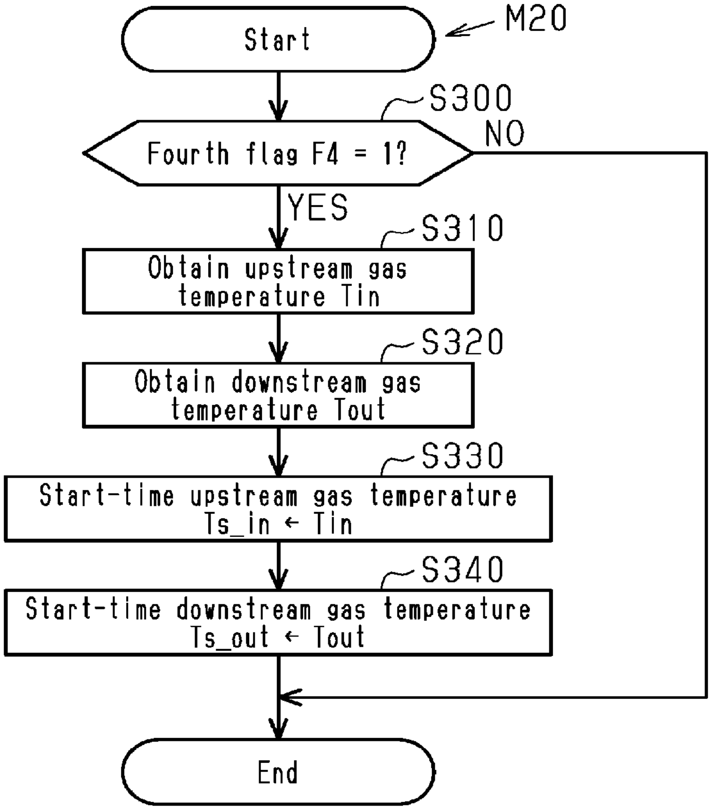
FIG. 9 is a flowchart showing a routine related to a start temperature obtaining process M20 shown in FIG. 5.

FIG. 9 is a flowchart showing a routine related to the start temperature obtaining process M20. The routine shown in FIG. 9 is performed by the processing circuitry 111 executing programs stored in the memory. The processing circuitry 111 repeatedly executes this routine from when the main switch of the vehicle is turned on until the start-time upstream gas temperature Ts_in and the start-time downstream gas temperature Ts_out are set.

As shown in FIG. 9, when starting this routine, the processing circuitry 111 determines whether the fourth flag F4 has a value of 1 in the process of step S300. When determining in the process of step S300 that the fourth flag F4 has a value of 1 (step S300: YES), the processing circuitry 111 advances the process to step S310.

In the process of step S310, the processing circuitry 111 obtains the upstream gas temperature Tin. Then, in the process of the subsequent step S320, the processing circuitry 111 obtains the downstream gas temperature Tout.

Next, in the process of step S330, the processing circuitry 111 assigns the upstream gas temperature Tin to the start-time upstream gas temperature Ts_in. In this manner, the processing circuitry 111 sets the start-time upstream gas temperature Ts_in through the step S330.

Next, in the process of step S340, the processing circuitry 111 assigns the downstream gas temperature Tout to the start-time downstream gas temperature Ts_out. In this manner, the processing circuitry 111 sets the start-time downstream gas temperature Ts_out through the step S340.

After setting the start-time upstream gas temperature Ts_in and the start-time downstream gas temperature Ts_out in this manner, the processing circuitry 111 ends this routine. On the other hand, in the process of step S300, when determining that the fourth flag F4 does not have a value of 1 (step S300 NO), the processing circuitry 111 does not execute the processes of step S310 to S340, and temporarily suspends the routine. That is, the processing circuitry 111 repeats the start temperature obtaining process M20 until the calculation condition is met so that the fourth flag F4 has a value of 1. Then, when the calculation condition is met, so that the fourth flag F4 has a value of 1, the processing circuitry 111 sets the start-time temperature Ts (that is, Ts_in, Ts_out) to the gas temperature T (that is, Tin, Tout) at that time.

<Integrated Value Calculating Process M30>

Figure 10:
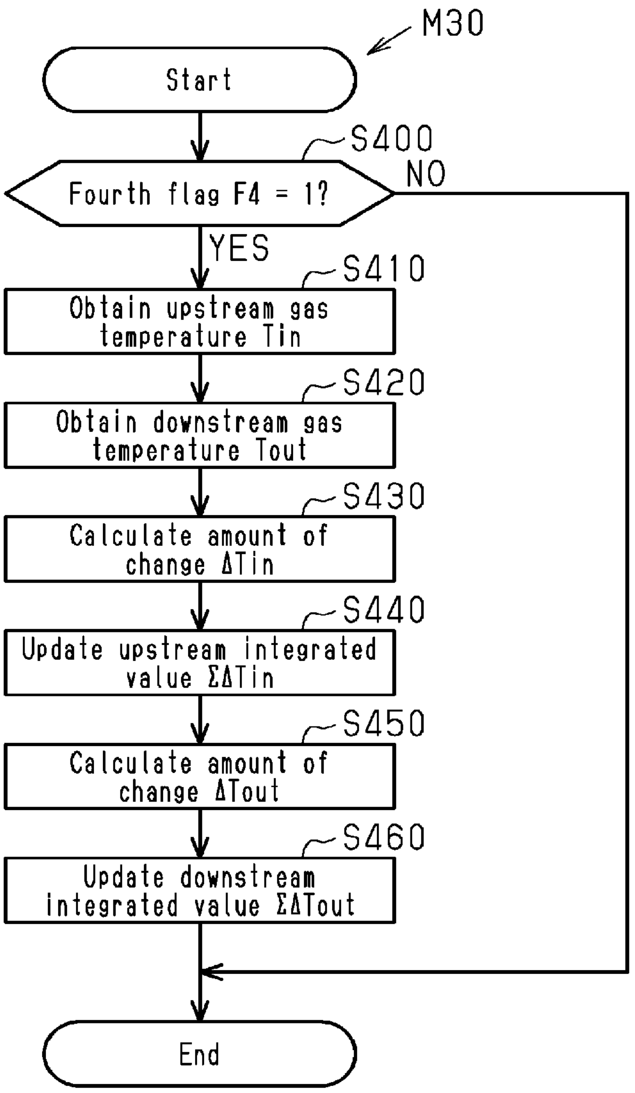
FIG. 10 is a flowchart showing a routine related to an integrated value calculating process M30 shown in FIG. 5.

FIG. 10 is a flowchart showing a routine related to the integrated value calculating process M30. The routine shown in FIG. 10 is performed by the processing circuitry 111 executing programs stored in the memory. The processing circuitry 111 repeatedly executes this routine while the engine control unit 110 is operating as a result of the main switch of the vehicle being turned on.

As shown in FIG. 10, when starting this routine, the processing circuitry 111 determines whether the fourth flag F4 has a value of 1 in the process of step S400. When determining in the process of step S400 that the fourth flag F4 has a value of 1 (step S400: YES), the processing circuitry 111 advances the process to step S410.

In the process of step S410, the processing circuitry 111 obtains the upstream gas temperature Tin. Then, in the process of the subsequent step S420, the processing circuitry 111 obtains the downstream gas temperature Tout.

Next, the processing circuitry 111 calculates an amount of change ΔTin in the process of step S430. Specifically, the processing circuitry 111 calculates a difference obtained by subtracting the start-time upstream gas temperature Ts_in from the upstream gas temperature Tin obtained in the current cycle. The calculated difference is the amount of change ΔTin.

The processing circuitry 111 updates the upstream integrated value ΣΔTin in the process of the subsequent step S440. The upstream integrated value ΣΔTin is an integrated value of the amount of change ΔTin after the starting of the engine 10. Specifically, the processing circuitry 111 calculates a sum obtained by adding the amount of change ΔTin calculated through the process of the step S430 in the current cycle to the upstream integrated value ΣΔTin updated through the process of the step S440 in the previous cycle. The calculated sum is a new upstream integrated value ΣΔTin.

Next, the processing circuitry 111 calculates an amount of change ΔTout in the process of step S450. Specifically, the processing circuitry 111 calculates a difference obtained by subtracting the start-time downstream gas temperature Ts_out from the downstream gas temperature Tout obtained in the current cycle. The calculated difference is the amount of change ΔTout.

The processing circuitry 111 updates the downstream integrated value ΔTout in the process of the subsequent step S460. The downstream integrated value ΔTout is an integrated value of the amount of change ΔTout after the starting of the engine 10. Specifically, the processing circuitry 111 calculates a sum obtained by adding the amount of change ΔTout calculated through the process of the step S450 in the current cycle to the downstream integrated value ΔTout updated through the process of the step S460 in the previous cycle. The calculated sum is a new downstream integrated value ΣΔTout.

After updating the upstream integrated value ΣΔTin and the downstream integrated value ΔTout in the above-described manner, the processing circuitry 111 temporarily suspends this routine. On the other hand, in the process of step S400, when determining that the fourth flag F4 does not have a value of 1 (step S400 NO), the processing circuitry 111 does not execute the processes of step S410 to S460, and temporarily suspends the routine. That is, when the calculation condition is satisfied, so that the fourth flag F4 has a value of 1, the upstream integrated value ΣΔTin and the downstream integrated value ΔTout are updated.

<Calculation End Determining Process M42>

Figure 11:
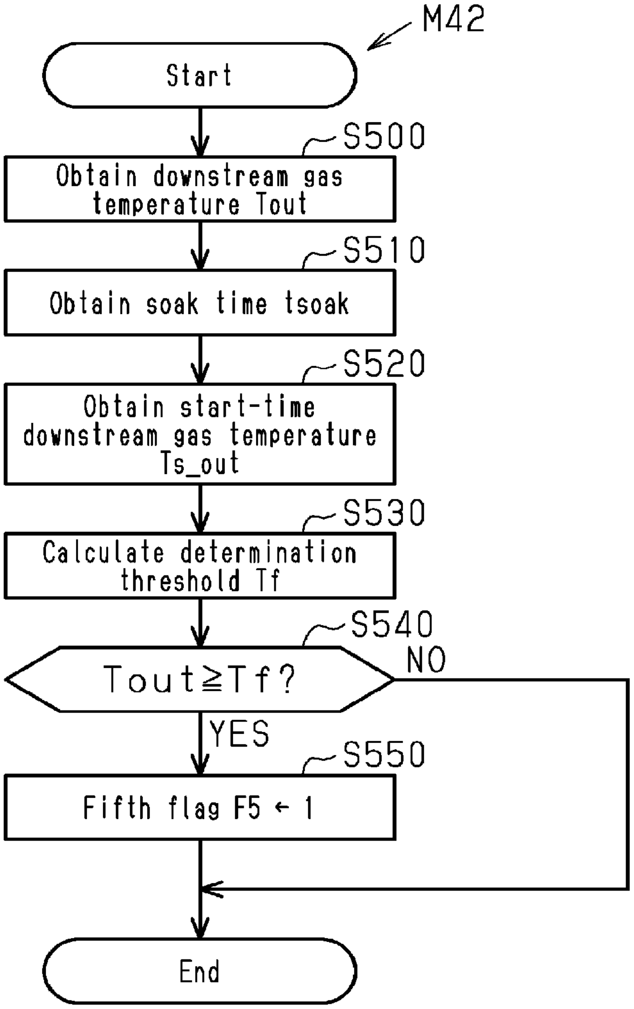
FIG. 11 is a flowchart showing a routine related to a calculation end determining process M42 shown in FIG. 5.

FIG. 11 is a flowchart showing a routine related to the calculation end determining process M42. The routine shown in FIG. 11 is performed by the processing circuitry 111 executing programs stored in the memory. The processing circuitry 111 repeatedly executes this routine from when the start-time downstream gas temperature Ts_out is set until the processing circuitry 111 assigns 1 to a fifth flag F5.

As shown in FIG. 11, when this routine is started, the processing circuitry 111 first obtains the downstream gas temperature Tout in the process of step S500. Then, in the process of the subsequent step S510, the processing circuitry 111 obtains the soak time tsoak. Next, in the process of step S520, the processing circuitry 111 obtains the start-time downstream gas temperature Ts_out.

Then, in the process of step S530, the processing circuitry 111 calculates the determination threshold Tf. In the process of step S530, for example, the processing circuitry 111 calculates a product greater than the start-time downstream gas temperature Ts_out by multiplying the start-time downstream gas temperature Ts_out by a correction factor Kcor greater than 1.0. This product is the determination threshold Tf. The processing circuitry 111 calculates the correction factor Kcor by map calculation using the soak time tsoak as an input variable. The map used for this calculation is designed such that the correction factor Kcor increases as the soak time tsoak becomes shorter, based on results of experiments conducted in advance. After calculating the determination thresholds Tf based on the soak time tsoak through the process of step S530, the processing circuitry 111 advances the process to step S540.

In the process of step S540, the processing circuitry 111 determines whether the downstream gas temperature Tout is higher than or equal to the determination threshold Tf. When determining in step S540 that the downstream gas temperature Tout is higher than or equal to the determination threshold Tf (step S540: YES), the processing circuitry 111 advances the process to step S550. Then, the processing circuitry 111 assigns 1 to the fifth flag F5 in the process of step S550. When having a value of 1, the fifth flag F5 indicates that the calculation termination conditions for the upstream integrated value ΣΔTin and the downstream integrated value ΣΔTout are met. When not having a value of 1, the fifth flag F5 indicates that the calculation termination conditions for the upstream integrated value ΣΔTin and the downstream integrated value ΣΔTout are not met.

After assigning 1 to the fifth flag F5 in the process of step S550, the processing circuitry 111 ends the routine. On the other hand, when determining in step S540 that the downstream gas temperature Tout is lower than the determination threshold Tf (step S540: NO), the processing circuitry 111 temporarily suspends the routine without executing the process of step S550.

<Execution Condition Determining Process M40>

Referring back to FIG. 5, the processing circuitry 111 repeatedly executes the execution condition determining process M40 while the engine control unit 110 is operating as a result of the main switch of the vehicle being turned on. In the execution condition determining process M40, the processing circuitry 111 determines whether the execution condition of the anomaly diagnosing process M50 is met. Specifically, in the execution condition determining process M40, the processing circuitry 111 obtains the fourth flag F4 and the fifth flag F5, and determines that the execution condition of the anomaly diagnosing process M50 is met when the fourth flag F4 and the fifth flag F5 both have a value of 1. When at least one of the fourth flag F4 and the fifth flag F5 has a value of 0, the processing circuitry 111 determines that the execution condition of the anomaly diagnosing process M50 is not met.

When determining that the execution condition of the anomaly diagnosing process M50 is met, the processing circuitry 111 assigns 1 to a sixth flag F6. When determining that the execution condition of the anomaly diagnosing process M50 is not met, the processing circuitry 111 assigns 0 to the sixth flag F6. When having a value of 1, the sixth flag F6 indicates that the execution condition of the anomaly diagnosing process M50 is met. When having a value of 0, the sixth flag F6 indicates that the execution condition of the anomaly diagnosing process M50 is not met.

<Anomaly Diagnosing Process M50>

FIG. 12 is a flowchart showing a routine related to the anomaly diagnosing process M50. The routine shown in FIG. 12 is performed by the processing circuitry 111 executing programs stored in the memory. The processing circuitry 111 repeatedly executes this routine while the engine control unit 110 is operating as a result of the main switch of the vehicle being turned on, until the processing circuitry 111 sets a seventh flag F7.

As shown in FIG. 12, when starting this routine, the processing circuitry 111 determines whether the sixth flag F6 has a value of 1 in the process of step S600. When determining in the process of step S600 that the sixth flag F6 has a value of 1 (step S600: YES), the processing circuitry 111 advances the process to step S610.

In the process of step S610, the processing circuitry 111 obtains the upstream integrated value ΣΔTin. Then, in the process of the subsequent step S620, the processing circuitry 111 obtains the downstream integrated value ΣΔTout.

Figure 13:
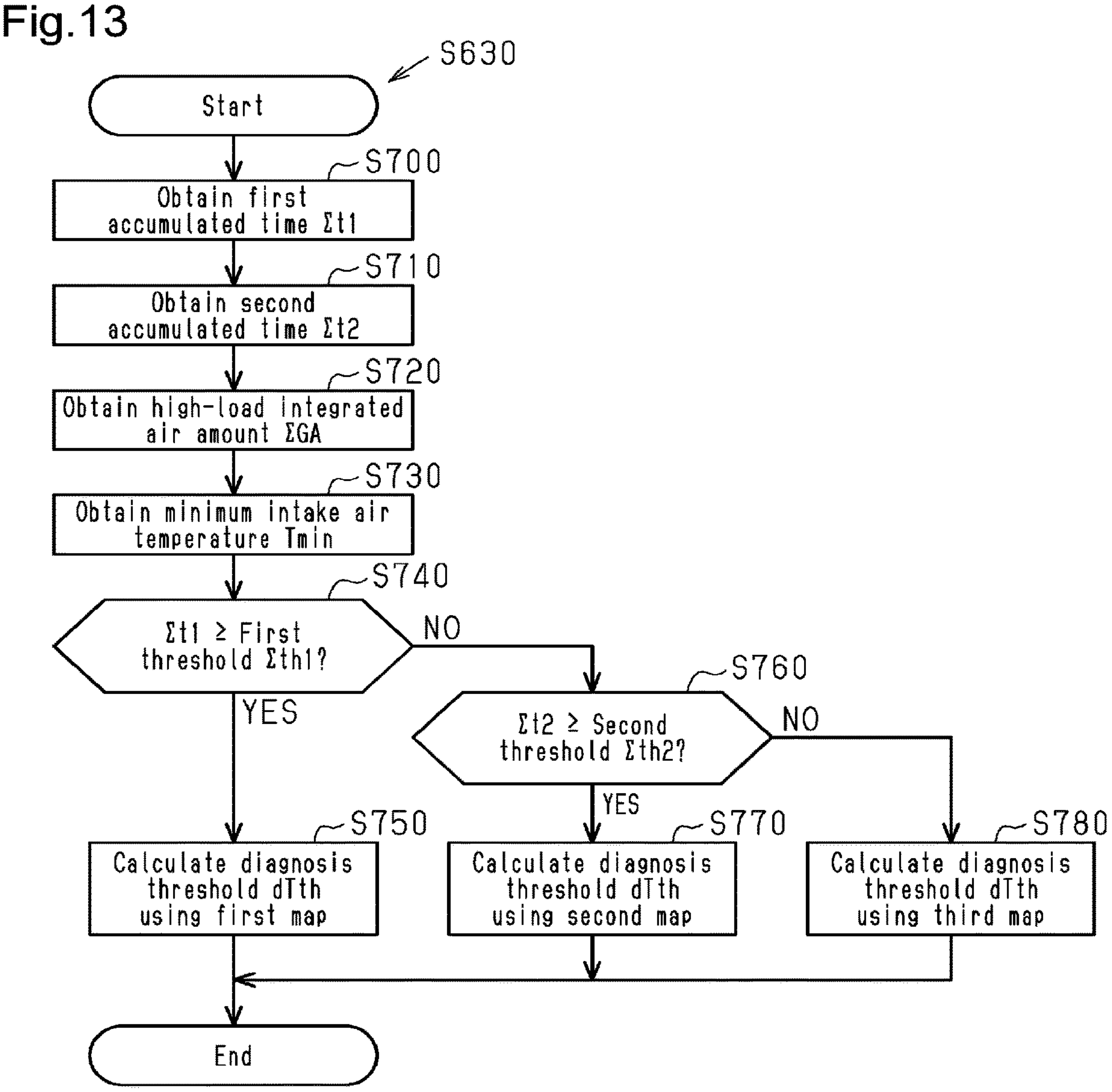
FIG. 13 is a flowchart showing a routine related to a threshold calculating process (S630) shown in FIG. 12.

Next, the processing circuitry 111 executes a threshold calculating process as the process of step S630. FIG. 13 is a flowchart showing a routine related to the threshold calculating process. As shown in FIG. 13, when starting the threshold calculating process, the processing circuitry 111 obtains the first accumulated time Σt1, which has been updated in the above-described updating process, in the process of step S700. In the process of the next step S710, the processing circuitry 111 obtains the second accumulated time Σt2. The processing circuitry 111 obtains the high-load integrated air amount ΣGA in the process of step S720. The processing circuitry 111 obtains the minimum intake air temperature Tmin in the process of step S730.

Next, in the process of step S740, the processing circuitry 111 determines whether the first accumulated time Σt1 is longer than or equal to a first threshold Σth1. The first threshold Σth1 is a threshold for determining whether the rate at which the first temperature increase control is executed in the current trip is high. When determining in the process of step S740 that the first accumulated time Σt1 is longer than or equal to the first threshold Σth1 (step S740: YES), the processing circuitry 111 advances the process to step S750. In the process of step S750, the processing circuitry 111 calculates the diagnosis threshold dTth using a first map. The first map is a calculation map for calculating the diagnosis threshold dTth by using the high-load integrated air amount ΣGA and the minimum intake air temperature Tmin as input variables. The first map is designed based on results of experiments and the like performed in advance such that the output value of the diagnosis threshold dTth decreases as the high-load integrated air amount ΣGA increases, and the output value of the diagnosis threshold dTth decreases as the minimum intake air temperature Tmin decreases.

When determining in the process of step S740 that the first accumulated time Σt1 is shorter than the first threshold Σth1 (step S740: NO), the processing circuitry 111 advances the process to step S760. In the process of step S760, the processing circuitry 111 determines whether the second accumulated time Σt2 is longer than or equal to a second threshold Σth2. The second threshold Σth2 is a threshold for determining whether the rate at which the second temperature increase control is executed in the current trip is high.

When determining in the process of step S760 that the second accumulated time Σt2 is longer than or equal to the second threshold Σth2 (step S760: YES), the processing circuitry 111 advances the process to step S770. In the process of step S770, the processing circuitry 111 calculates the diagnosis threshold dTth using a second map. The second map is also a calculation map for calculating the diagnosis threshold dTth by using the high-load integrated air amount ΣGA and the minimum intake air temperature Tmin as input variables. The second map is also designed based on results of experiments and the like performed in advance such that the output value of the diagnosis threshold dTth decreases as the high-load integrated air amount ΣGA increases, and the output value of the diagnosis threshold dTth decreases as the minimum intake air temperature Tmin decreases. The second map is designed to output a value of the diagnosis threshold dTth greater than the diagnosis threshold dTth of the first map when the input variables are the same.

When determining in the process of step S760 that the second accumulated time Σt2 is shorter than the second threshold Σth2 (step S760: NO), the processing circuitry 111 advances the process to step S780. In the process of step S780, the processing circuitry 111 calculates the diagnosis threshold dTth using a third map. The third map is also a calculation map for calculating the diagnosis threshold dTth by using the high-load integrated air amount ΣGA and the minimum intake air temperature Tmin as input variables. The third map is also designed based on results of experiments and the like performed in advance such that the output value of the diagnosis threshold dTth decreases as the high-load integrated air amount ΣGA increases, and the output value of the diagnosis threshold dTth decreases as the minimum intake air temperature Tmin decreases. The third map is designed to output a value of the diagnosis threshold dTth greater than the diagnosis threshold dTth of the second map when the input variables are the same.

After calculating the diagnosis threshold dTth through the process of step S750, the process of step S770, or the process of step S780, the processing circuitry 111 ends the threshold calculating process as step S630 of FIG. 12. Then, as shown in FIG. 12, the processing circuitry 111 advances the process to step S640. In step S640, the processing circuitry 111 determines whether a quotient obtained by dividing the upstream integrated value ΣΔTin by the downstream integrated value ΣΔTout is greater than or equal to the diagnosis threshold dTth. When determining that the quotient obtained by dividing the upstream integrated value ΣΔTin by the downstream integrated value ΣΔTout is greater than or equal to the diagnosis threshold dTth (step S640: YES), the processing circuitry 111 advances the process to step S650. Then, the processing circuitry 111 assigns 0 to the seventh flag F7 in the process of step S650.

When determining that the quotient obtained by dividing the upstream integrated value ΣΔTin by the downstream integrated value ΣΔTout is less than the diagnosis threshold dTth (step S640: NO), the processing circuitry 111 advances the process to step S660. Then, the processing circuitry 111 obtains an anomaly determination result indicating that the exhaust purification device (34) has been removed from the exhaust passage 30, and assigns 1 to the seventh flag F7 in the process of step S660.

When having a value of 1, the seventh flag F7 indicates that the anomaly determination result has been obtained through the anomaly diagnosing process M50, indicating that the exhaust purification device (34) has been removed from the exhaust passage 30. When having a value of 0, the seventh flag F7 indicates that a normality determination result has been obtained through the anomaly diagnosing process M50. That is, it indicates that no anomaly determination result has been obtained. When setting the seventh flag F7 by executing the process of step S650 or step S660 in this manner, the processing circuitry 111 ends this routine.

In the process of step S600, when determining that the sixth flag F6 does not have a value of 0 (step S600 NO), the processing circuitry 111 does not execute the processes of step S600 to S660, and temporarily suspends the routine of FIG. 12.

<Outside Air Temperature Determining Process M60>

Figure 14:
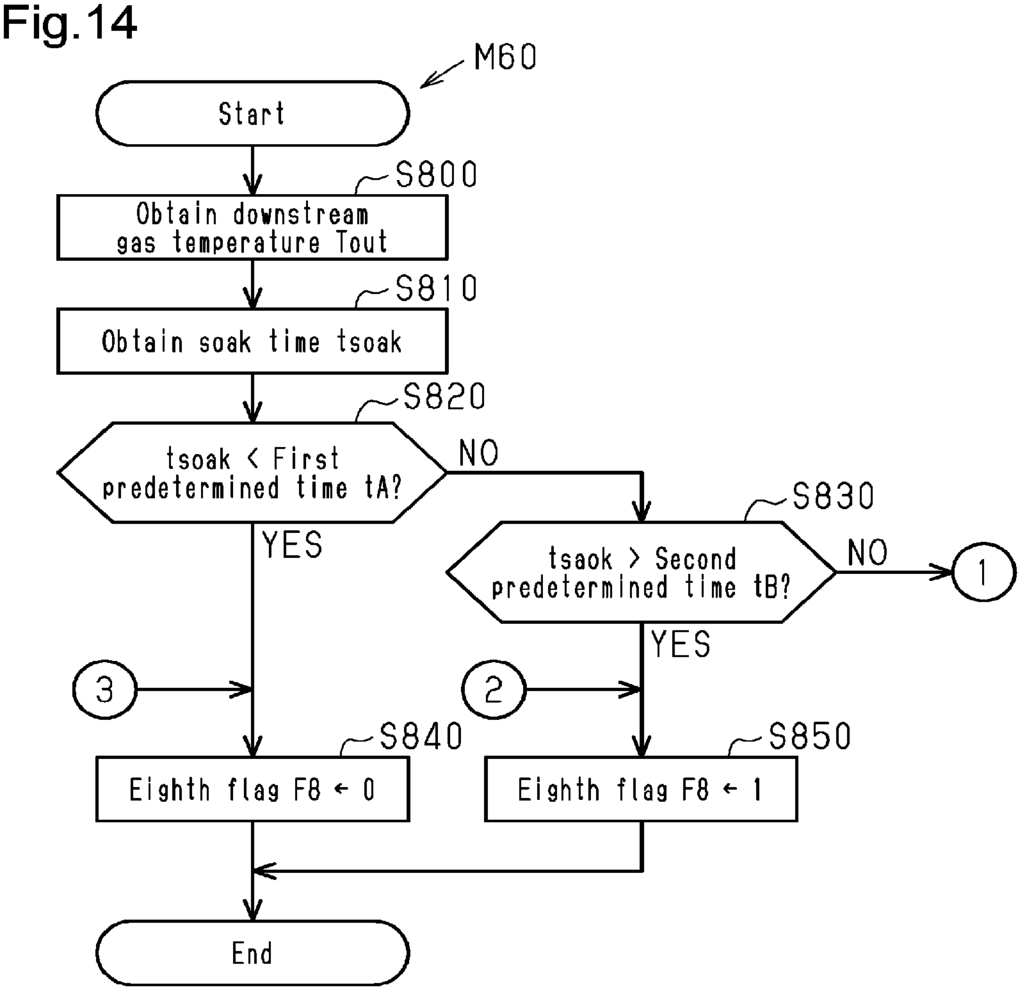
FIG. 14 is a flowchart showing a part of a routine related to an outside air temperature determining process (outside air temperature estimating process) M60 shown in FIG. 5.
Figure 15:
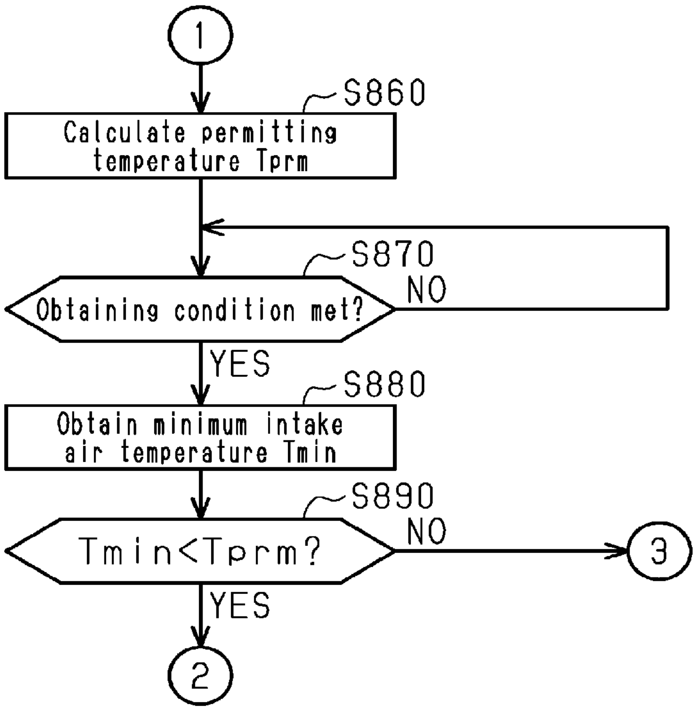
FIG. 15 is a flowchart showing a part that is not shown in FIG. 14 of the routine related to the outside air temperature determining process M60 shown in FIG. 5.

FIGS. 14 and 15 are flowcharts showing a routine related to the outside air temperature determining process M60. The routine shown in FIGS. 14 and 15 is performed by the processing circuitry 111 executing programs stored in the memory. The processing circuitry 111 executes this routine when the engine control unit 110 is activated as a result of the main switch of the vehicle being turned on.

As shown in FIG. 14, when this routine is started, the processing circuitry 111 first obtains the downstream gas temperature Tout in the process of step S800. In the process of the subsequent step S810, the processing circuitry 111 obtains the soak time tsoak.

Next, in the process of step S820, the processing circuitry 111 determines whether the soak time tsoak is shorter than a first predetermined time tA. The first predetermined time tA is a threshold used to determine that the length of the soak time tsoak is insufficient to finalize the diagnosis result of the anomaly diagnosing process M50.

When determining in the process of step S820 that the soak time tsoak is shorter than the first predetermined time tA (step S820: YES), the processing circuitry 111 advances the process to step S840. Then, the processing circuitry 111 assigns 0 to an eighth flag F8 in the process of step S840. When having a value of 1, the eighth flag F8 indicates that a condition for finalizing the diagnosis result of the anomaly diagnosing process M50 is met. When having a value of 0, the eighth flag F8 indicates that the condition for finalizing the diagnosis result of the anomaly diagnosing process M50 is not met.

When determining in the process of step S820 that the soak time tsoak is longer than or equal to the first predetermined time tA (step S820: NO), the processing circuitry 111 advances the process to step S830. In the process of step S830, the processing circuitry 111 determines whether the soak time tsoak is longer than a second predetermined time tB. The second predetermined time tB is a threshold used to determine that the length of the soak time tsoak is sufficient to finalize the diagnosis result of the anomaly diagnosing process M50.

When determining in the process of step S830 that the soak time tsoak is longer than the second predetermined time tB (step S830: YES), the processing circuitry 111 advances the process to step S850. Then, the processing circuitry 111 assigns 1 to the eighth flag F8 in the process of step S850.

When determining in the process of step S830 that the soak time tsoak is shorter than or equal to the second predetermined time tB (step S830: NO), the processing circuitry 111 advances the process to step S860 as shown in FIG. 15. In the process of step S860, the processing circuitry 111 calculates a permitting temperature Tprm based on the soak time tsoak. Specifically, the processing circuitry 111 sets the permitting temperature Tprm to a larger value as the soak time tsoak is extended.

Next, the processing circuitry 111 determines whether an obtaining condition of the minimum intake air temperature Tmin is met in the process of step S870. The obtaining condition is logical disjunction of the following three conditions (A), (B), and (C).

(A) The first condition is that the integrated value of the intake air amount Ga in a state in which the vehicle speed SPD is greater than or equal to a predetermined vehicle speed is greater than or equal to a predetermined amount.

(B) The second condition is that, based on changes in the atmospheric pressure PA, it has been estimated that the altitude has changed by a predetermined level or more from that at the starting of the engine 10.

(C) The third condition is that the traveled distance in the current trip is greater than or equal to a predetermined distance.

When any one of the conditions (A) to (C) described above is met, the processing circuitry 111 determines that the obtaining condition is met in the process of step S870.

The condition (A) is a condition for determining that the inside of the engine compartment has been scavenged by relative wind. The conditions (B) and (C) are conditions for determining whether the diagnosis result should be finalized before the change in the environment from the time point at which the starting of the engine 10 is completed reaches an unacceptable level.

When determining in the process of step S870 that the obtaining condition is met (step S870: YES), the processing circuitry 111 advances the process to step S880. When determining in the process of step S870 that the obtaining condition is not satisfied (step S870: NO), the processing circuitry 111 repeats the process of step S870. That is, the processing circuitry 111 waits until the obtaining condition is satisfied and then advances the process to step S880. In the process of step S880, the processing circuitry 111 obtains the minimum intake air temperature Tmin. The obtained minimum intake air temperature Tmin is used as the outside air temperature estimated value. Then, the processing circuitry 111 determines whether the minimum intake air temperature Tmin is lower than the permitting temperature Tprm in the process of the subsequent step S890.

In the process of step S890, when determining that the minimum intake air temperature Tmin is lower than the permitting temperature Tprm (step S890: YES), the processing circuitry 111 advances the process to step S850. Then, the processing circuitry 111 assigns 1 to the eighth flag F8 in the process of step S850. When determining in the process of step S890 that the minimum intake air temperature Tmin is higher than or equal to the permitting temperature Tprm (step S890: YES), the processing circuitry 111 advances the process to step S840. Then, the processing circuitry 111 assigns 0 to the eighth flag F8 in the process of step S840.

After setting the eighth flag F8 through the process of step S840 and/or the process of step S850 in the above-described manner, the processing circuitry 111 ends this routine.

<Finalizing Process M70>

Figure 16:
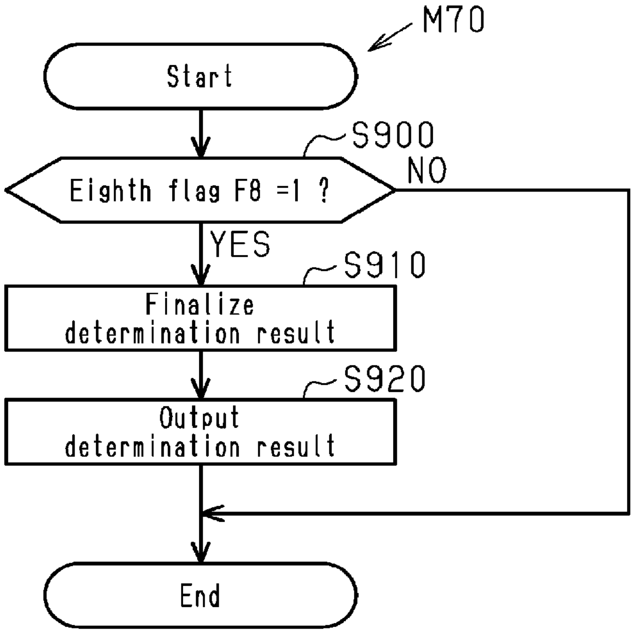
FIG. 16 is a flowchart showing a routine related to a finalizing process M70 shown in FIG. 5.

FIG. 16 is a flowchart showing a routine related to the finalizing process M70. The routine shown in FIG. 16 is performed by the processing circuitry 111 executing programs stored in the memory. The processing circuitry 111 executes this routine when the seventh flag F7 is set through the anomaly diagnosing process M50.

As shown in FIG. 16, when starting this routine, the processing circuitry 111 determines whether the eighth flag F8 has a value of 1 in the process of step S900. When determining in the process of step S900 that the eighth flag F8 has a value of 1 (step S900: YES), the processing circuitry 111 advances the process to step S910. In the process of step S910, the processing circuitry 111 finalizes, as a valid diagnosis result, the result of the determination by the anomaly diagnosing process M50. Specifically, when the seventh flag F7 has a value of 1, the processing circuitry 111 finalizes, as a formal diagnosis result, the anomaly determination result by the anomaly diagnosing process M50. When the seventh flag F7 has a value of 0, the processing circuitry 111 finalizes, as a valid diagnosis result, the normality determination result indicating that no anomaly determination result has been obtained. After finalizing the determination result, the processing circuitry 111 outputs the finalized determination result in the process of the subsequent step S920 and ends this routine.

When determining in the process of step S900 that the eighth flag F8 has a value of 0 (step S900 YES), the processing circuitry 111 does not execute the process of step S910 or the process of step S920, and ends the routine. That is, in this case, the processing circuitry 111 does not finalize the determination result by the anomaly diagnosing process M50 even if the anomaly diagnosing process M50 makes an anomaly diagnosis. Then, the processing circuitry 111 ends the routine without outputting a determination result.

As described above, when the outside air temperature determining process M60 does not assign 1 to the eighth flag F8, the engine control unit 110 does not finalize, as a valid diagnosis result, the determination result by the anomaly diagnosing process M50 and thus does not output a diagnosis result.

<Operation of Present Embodiment>

On condition that the calculation condition including the cold state determination (M12, F2=1) is met (M10, F4=1), the upstream integrated value ΣΔTin and the downstream integrated value ΣΔTout are calculated in the integrated value calculating process M30. On a condition that the execution condition is met when the downstream gas temperature Tout becomes higher than or equal to the determination threshold Tf (S540: YES), the anomaly diagnosing process M50 is executed. In the anomaly diagnosing process M50, the quotient obtained by dividing the upstream integrated value ΣΔTin by the downstream integrated value ΣΔTout is determined to be less than the diagnosis threshold dTth (S640: NO), the seventh flag F7 is set to 1 (S660) due to an anomaly determination result being obtained. When the soak time tsoak is longer than the second predetermined time tB (S830: YES) or when the minimum intake air temperature Tmin is lower than the permitting temperature Tprm (S890: YES), the anomaly determination result is finalized as a valid diagnosis result (F8=1).

<Advantages of Present Embodiment>

(1) When the exhaust purification device (34) is installed in the exhaust passage 30, the heat of exhaust gas is consumed as the heat of vaporization of water until the water collected on the exhaust purification device (34) evaporates. Accordingly, the deviation between the upstream integrated value ΣΔTin and the downstream integrated value ΣΔTout increases until the downstream gas temperature Tout becomes higher than or equal to the determination threshold Tf, which is higher than the dew point (FIG. 3). When the exhaust purification device (34) has been removed from the exhaust passage 30, heat exchange is not performed between the exhaust gas conducted into the exhaust purification device (34) and the exhaust purification device (34). Thus, the increase in the downstream gas temperature Tout does not stagnate. Accordingly, the deviation between the upstream integrated value ΔTin and the downstream integrated value ΣΔTout decreases until the downstream gas temperature Tout becomes higher than or equal to the determination threshold Tf (FIG. 4).

In this regard, the processing circuitry 111 of the engine control unit 110 executes the anomaly diagnosing process M50, which obtains an anomaly determination result indicating that the exhaust purification device (34) has been removed from the exhaust passage 30 when the deviation between the upstream integrated value ΣΔTin and the downstream integrated value ΣΔTout is relatively small. Therefore, the engine control unit 110 performs anomaly determination with high accuracy based on the fact that the deviation between the upstream integrated value ΣΔTin and the downstream integrated value ΣΔTout is smaller than the reference level.

(2) In a case in which the exhaust passage 30 is long from the engine 10 to the exhaust purification device (34) or in a case of a low-load operation, changes in the upstream gas temperature Tin and the downstream gas temperature Tout are unlikely to be different from each other. Therefore, for example, when anomaly determination is performed by comparing the inclination of the upstream gas temperature Tin with the inclination of the downstream gas temperature Tout, erroneous determination is likely to occur. In this regard, the anomaly diagnosing process M50 of the engine control unit 110 uses the upstream integrated value ΣΔTin and the downstream integrated value ΣΔTout, which have been integrated over a certain period of time (M30). Therefore, in the present embodiment, although it takes some time, the anomaly determination is performed with higher accuracy than, for example, a case in which the inclination of the upstream gas temperature Tin and the inclination of the downstream gas temperature Tout are compared with each other.

(3) During a high-load operation, since the intake air amount Ga is relatively large, the flow rate of exhaust gas passing through the exhaust purification device (34) also increases. Therefore, even when the exhaust purification device (34) is installed in the exhaust passage 30, the downstream integrated value ΣΔTout is likely to increase during a high-load operation as compared with a case in which a high-load operation is not performed. Therefore, when the high-load integrated air amount ΣGA is relatively large, the quotient obtained by dividing the upstream integrated value ΣΔTin by the downstream integrated value ΣΔTout in the anomaly diagnosing process M50 is relatively small. As a result, an erroneous anomaly determination may be made.

In this regard, in the threshold calculating process (S630), the engine control unit 110 decreases the diagnosis threshold dTth as the high-load integrated air amount ΣGA increases. This allows the engine control unit 110 to prevent erroneous anomaly determinations.

(4) When the temperature increase control is performed, the temperature of exhaust gas increases. The temperature of the exhaust purification device (34) and the downstream gas temperature Tout are thus likely to increase. Therefore, even when the exhaust purification device (34) is installed in the exhaust passage 30, the downstream integrated value ΣΔTout is likely to increase in a case in which the temperature increase control is performed as compared with a case in which the temperature increase control is not performed. Therefore, when the temperature increase control is performed, the quotient obtained by dividing the upstream integrated value ΣΔTin by the downstream integrated value ΣΔTout in the anomaly diagnosing process M50 is relatively small. As a result, an erroneous anomaly determination may be made. In this regard, in the threshold calculating process (S630) of the anomaly diagnosing process M50, the engine control unit 110 reduces the diagnosis threshold dTth (S750, S770) when the accumulated time during which the temperature increase control is executed is longer than or equal to the threshold-value (S740: YES, S760: YES). This allows the engine control unit 110 to prevent erroneous anomaly determinations.

(5) The higher the temperature of the exhaust purification device (34) at the time when exhaust gas starts to pass through the exhaust purification device (34) upon completion of the starting of the engine 10, the shorter the time from the completion of the starting of the engine 10 until the downstream gas temperature Tout reaches a specified level becomes. The engine control unit 110 uses the soak time tsoak and the start-time downstream gas temperature Ts_out (S510, S520) as index values correlated with the temperature of the exhaust purification device (34) at completion of the starting of the engine 10. The engine control unit 110 changes the magnitude of the determination threshold Tf in accordance with these index values (S530). Therefore, the time for performing the integrated value calculating process M30 is secured by extending the time from the completion of the starting of the engine 10 until the downstream gas temperature Tout becomes higher than or equal to the determination threshold Tf. This allows the anomaly diagnosing process M50 to be performed properly.

(6) If the soak time tsoak is short, the exhaust purification device (34) has not been sufficiently cooled, and thus the temperature of the exhaust purification device (34) is relatively high. That is, the length of the soak time tsoak is an index value having a correlation with the temperature of the exhaust purification device (34) at the completion of the starting of the engine 10. Accordingly, the engine control unit 110 increases the determination threshold Tf as the soak time tsoak becomes shorter (S510, S530). As a result, the engine control unit 110 increases the time until the downstream gas temperature Tout becomes higher than or equal to the determination threshold Tf, so that the time for performing the integrated value calculating process M30 is secured.

(7) The start-time downstream gas temperature Ts_out is an index value correlated with the temperature of the upstream exhaust purification device (34). The engine control unit 110 thus increases the determination threshold Tf as the start-time downstream gas temperature Ts_out increases (S520, S530). As a result, the engine control unit 110 increases the time until the downstream gas temperature Tout becomes higher than or equal to the determination threshold Tf, so that the time for performing the integrated value calculating process M30 is secured.

(8) When the engine 10 is in a cold state at the time of starting, the degree of deviation between the upstream integrated value ΣΔTin and the downstream integrated value ΣΔTout is likely to be different between a case in which the exhaust purification device (34) has been removed from the exhaust passage 30 and a case in which the exhaust purification device (34) is installed in the exhaust passage 30. That is, if the engine 10 is in a cold state at the time of starting, the engine control unit 110 accurately performs an anomaly determination in the anomaly diagnosing process M50. The engine control unit 110 performs the anomaly diagnosing process M50 on a condition that the determination indicating a cold state is made (M12, F2=1). Thus, the engine control unit 110 accurately performs an anomaly determination in the anomaly diagnosing process M50.

(9) The lower the outside air temperature, the shorter the soak time tsoak required for the engine 10 to reach a cold state becomes. The start-time upstream gas temperature Ts_in indicates a temperature close to the outside air temperature. When the soak time tsoak is longer than or equal to the first predetermined time tth1 and shorter than or equal to the second predetermined time tth2 (S230: NO, S240: NO), the engine control unit 110 increases the permitting temperature Tth1 as the soak time tsoak is extended (S270, FIG. 8). Therefore, in the cold state determining process M12, the engine control unit 110 is capable of determining whether the engine 10 is in a cold state in a manner more suitable for the actual situation (S280). As a result, the engine control unit 110 ensures opportunities for the anomaly diagnosing process M50.

(10) The anomaly diagnosing process M50 is a process of performing anomaly determination based on the upstream integrated value ΣΔTin and the downstream integrated value ΣΔTout, focusing on a difference in thermal capacity of the exhaust passage 30 depending on whether the exhaust purification device (34) is installed in the exhaust passage After the downstream gas temperature Tout increases due to the operation of the engine anomaly determination cannot be appropriately performed through the anomaly diagnosing process M50 even if the integrated value calculating process M30 is executed again.

In this regard, if the calculation condition ceases to be met after being met, the engine control unit 110 does not execute, in that trip, the calculation condition determining process M10 or the integrated value calculating process M30 thereafter, and does not execute the anomaly diagnosing process M50. Accordingly, the engine control unit 110 not only avoids inappropriate executions of the anomaly diagnosing process M50, but also prevents unnecessary processes from being executed.

(12) A detection value of a temperature sensors may instantaneously deviate from the actual temperature by a significant amount due to noise. The engine control unit 110 does not update the gas temperature T depending on a detection value that significantly deviates from the value obtained immediately before by an amount greater than or equal to the determination value Xth (S140: NO). This prevents the upstream gas temperature Tin and the downstream gas temperature Tout from being values that significantly deviate from the actual temperatures due to the influence of noise.

(13) When the engine 10 is not operating, there is no gas flow in the exhaust passage 30. Therefore, the fluctuation of the detection value of a temperature sensor is small except for the influence of noise. On the other hand, when the starting of the engine 10 is completed, flow of the exhaust gas occurs in the exhaust passage 30, so that the fluctuation of the detection value of the temperature sensor increases even if the influence of noise is removed. In the gas temperature updating process, the engine control unit 110 uses the first determination value X1 as the determination value Xth (S130) until the starting of the engine 10 is completed (S110: NO). After the starting of the engine 10 is completed (S110: YES), a second determination value X2, which is greater than the first determination value X1, is used as the determination value Xth (S120). That is, the engine control unit 110 changes the magnitude of the determination value Xth in accordance with changes in the magnitude of fluctuations of the detection value before and after the completion of the starting. Therefore, the engine control unit 110 prevents the gas temperature T from not being updated due to fluctuations of the detection value.

(14) The processing circuitry 111 executes the finalizing process M70 of determining whether to finalize, as a valid diagnosis result, the result of determination by the anomaly diagnosing process M50, and outputting the finalized diagnosis result. When the soak time tsoak is shorter than the first predetermined time to (S820: YES), the processing circuitry 111 does not finalize, as a valid result, the result of determination by the anomaly diagnosing process M50 in the finalizing process M70, and does not output the diagnosis result (F8=0).

When the soak time tsoak is relatively short, there is a possibility that the exhaust system has not been sufficiently cooled, so that the anomaly diagnosing process M50 cannot be executed appropriately based on the upstream gas temperature Tin and the downstream gas temperature Tout. When the soak time tsoak is relatively short (S820: YES), the engine control unit 110 does not finalize, as a valid diagnosis result, the result of the anomaly diagnosing process M50 (F8=0) even if the determination by the anomaly diagnosing process M50 is performed. The engine control unit 110 does not output the diagnosis result. The engine control unit 110 is thus prevented from outputting an inappropriate diagnosis result.

(15) If the soak time tsoak is sufficiently long (S830: YES), the diagnosis result can be finalized (S910) by determining, from the soak time tsoak alone, that the result of the anomaly diagnosing process M50 executed after the starting from a cold state is an appropriate result (S850). However, if the diagnosis result is finalized only when the soak time tsoak is long enough to finalize the diagnosis result from the soak time tsoak alone, the opportunities to output the diagnosis result are reduced.

When the soak time tsoak is longer than or equal to the first predetermined time to and shorter than or equal to the second predetermined time tB (S830: NO), the engine control unit 110 sets the permitting temperature Tprm to be higher as the soak time tsoak becomes longer in the outside air temperature determining process M60 (S860). The engine control unit 110 uses the minimum intake air temperature Tmin as an outside air temperature estimated value based on the intake air temperature THA (S880). Then, on a condition that the minimum intake air temperature Tmin is lower than the permitting temperature Tprm (S890: YES), the engine control unit 110 finalizes and outputs the diagnosis result in the finalizing process M70 (S910, S920).

When the vehicle is in a stopped state, the temperature of the engine 10 is unlikely to decrease due to the hot air trapped in the engine compartment. In contrast, when relative wind flows into the engine compartment as a result of traveling of the vehicle, hot air trapped in the engine compartment is scavenged. The intake air temperature THA becomes closer to the outside air temperature than when the vehicle is in a stopped state. On a condition that the minimum intake air temperature Tmin, which was obtained when the obtaining condition was satisfied due to traveling of the vehicle (S870: YES) is lower than the permitting temperature Tprm (S890: YES), the engine control unit 110 finalizes and outputs the diagnosis result in the finalizing process M70 (S910, S920). As a result, the engine control unit 110 determine, through the finalizing process M70, that the diagnosis result is the result of the anomaly diagnosing process M50, which has been executed after the engine is started from a cold state in which the engine has been cooled to a temperature corresponding to the outside air temperature. Based on this determination, the engine control unit 110 finalizes, as a valid diagnosis result, the result of determination by the anomaly diagnosing process M50, and outputs the valid diagnosis result (S910, S920). That is, the engine control unit 110 ensures opportunities for outputting the diagnosis result through the finalizing process M70 based on the information of the estimated outside air temperature, which has been estimated using the intake air temperature THA.

<Modifications>

The above-described embodiment may be modified as follows. The above-described embodiment and the following modifications can be combined as long as the combined modifications remain technically consistent with each other.

The anomaly diagnosing process M50 of FIG. 12 determines that the deviation between the upstream integrated value ΣΔTin and the downstream integrated value ΣΔTout is smaller than the reference level based on the fact that the quotient obtained by dividing the upstream integrated value ΣΔTin by the downstream integrated value ΣΔTout is less than the diagnosis threshold dTth (S640: NO). However, the method of determining that the deviation between the upstream integrated value ΣΔTin and the downstream integrated value ΣΔTout is smaller than the reference level is not limited to this. The method of determining may be changed. For example, the deviation between the upstream integrated value ΣΔTin and the downstream integrated value ΣΔTout may be determined to be smaller than the reference level based on the fact that the deviation is less than a diagnosis threshold.

The threshold calculating process (S630) of FIG. 13 may lack the configuration in which the larger the high-load integrated air amount ΣGA, the smaller the diagnosis threshold dTth becomes.

In the threshold calculating process (S630) of FIG. 13, the maps are switched such that the diagnosis threshold dTth is smaller when the first accumulated time Σt1 is longer than or equal to the first threshold Σth1 (S740: YES) than when the second accumulated time Σt2 is longer than or equal to the second threshold Σth2 (S760: YES). It is not necessary to employ this configuration, in which the magnitude of the diagnosis threshold dTth is changed by dividing the temperature increase control into the first temperature increase control and the second temperature increase control.

The threshold calculating process (S630) of FIG. 13 may calculate the diagnosis threshold dTth regardless of whether the temperature increase control is executed.

When the calculation end determining process M42 of FIG. 11 calculates the determination threshold Tf, the soak time tsoak and the start-time downstream gas temperature Ts_out are used as the index values correlated with the temperature of the exhaust purification device (34). One of the soak time tsoak and the start-time downstream gas temperature Ts_out may be used as an index value. Also, the index value may be the coolant temperature THW. Further, the index value may be the upstream gas temperature Tin.

The cold state determining process M12 of FIG. 7 may determine that the engine 10 at the time of starting is in a cold state when the soak time tsoak is longer than or equal to the first predetermined time tth1.

The outside air temperature determination process M60 of FIG. 14 may assign 1 to the eighth flag F8 when the soak time tsoak is longer than or equal to the first predetermined time tA.

The process for estimating the accumulated amount DPM is not limited to that illustrated in FIG. 2. The accumulated amount DPM may be estimated based on the intake air amount Ga and the pressure difference between the upstream side and the downstream side of the GPF 34. Specifically, the accumulated amount DPM may be estimated to be larger when the pressure difference is relatively large than when the pressure difference is relatively small. Also, even if the pressure difference is the same, the accumulated amount DPM may be estimated to be larger when the intake air amount Ga is relatively small than when the intake air amount Ga is relatively large. In a case in which the pressure on the downstream side of the GPF 34 is regarded to be constant, the above-described pressure Pex can be used in place of the pressure difference.

The layout of the three-way catalyst 32 and the GPF 34 in the exhaust passage 30 may be a layout in which the GPF 34 is disposed on the upstream side of the three-way catalyst 32.

The GPF 34 is not limited to a filter supporting a three-way catalyst, but may be a simple filter. The GPF 34 does not necessarily need to be placed on the downstream side of the three-way catalyst 32 in the exhaust passage 30. Further, the GPF 34 may be omitted. For example, the three-way catalyst 32 may function as an exhaust purification device. The engine control unit 110 may be of any type if it determines whether the exhaust purification device has been removed from the exhaust passage 30. In this case, the upstream temperature sensor 87 detects the temperature on the upstream side of the three-way catalyst 32. Further, the three-way catalyst 32 and the GPF 34 may collectively function as an exhaust purification device.

The engine control unit 110 is not limited to a device that includes the processing circuitry 111 and a memory, and executes software processing. For example, at least part of the processes executed by the software in the above-described embodiment may be executed by hardware circuits dedicated to executing these processes (such as an application-specific integrated circuit (ASIC)). That is, the engine control unit 110 may be modified if it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and multiple dedicated hardware circuits may be provided.

The vehicle is not limited to a series-parallel hybrid electric vehicle, but may be a parallel hybrid electric vehicle or a series hybrid electric vehicle. Further, the vehicle is not limited to a hybrid electric vehicle, but may be a vehicle that includes only the engine 10 as a drive force generator.

In the above-described embodiment, the engine 10 is an in-line four-cylinder engine, which includes four cylinders. However, the engine 10 controlled by the engine control unit 110 is not limited thereto. That is, the engine 10 is not limited to a four-cylinder engine. Further, the engine 10 may be a V engine, a horizontally opposed engine, or a W engine, in which an exhaust purification device (34) is provided for each bank.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the controller being employed for the internal combustion engine mounted on a vehicle, the controller comprising processing circuitry, the processing circuitry being configured to execute an integrated value calculating process and an anomaly diagnosing process, wherein the integrated value calculating process repeatedly obtains an upstream gas temperature that indicates a temperature of exhaust gas upstream of an exhaust purification device in an exhaust passage, and a downstream gas temperature that indicates a temperature of exhaust gas downstream of the exhaust purification device, and calculates an upstream integrated value that is an integrated value of a difference obtained by subtracting the upstream gas temperature at a starting point in time of integration from the upstream gas temperature after starting of the internal combustion engine, and a downstream integrated value that is an integrated value of a difference obtained by subtracting the downstream gas temperature at the starting point in time of the integration from the downstream gas temperature after the starting of the internal combustion engine, and the anomaly diagnosing process obtains an anomaly determination result indicating that the exhaust purification device is in a removed state when a deviation between the upstream integrated value and the downstream integrated value, taken over a range ending when the downstream gas temperature becomes higher than or equal to a determination threshold, after a time since the starting of the internal combustion engine is smaller than a reference level, the determination threshold being higher than a dew point.

2. The controller for the internal combustion engine according to claim 1, wherein the processing circuitry is configured to obtain the anomaly determination result when, in the anomaly diagnosing process, a quotient obtained by dividing the upstream integrated value, taken until the downstream gas temperature becomes higher than or equal to the determination threshold after the starting of the internal combustion engine, by the downstream integrated value is less than a diagnosis threshold.

3. The controller for the internal combustion engine according to claim 2, wherein the processing circuitry is configured to reduce the diagnosis threshold as a high-load integrated air amount increases, and the high-load integrated air amount is an integrated value of an intake air amount during high-load operation in a period after the starting of the internal combustion engine until the downstream gas temperature becomes higher than or equal to the determination threshold.

4. The controller for the internal combustion engine according to claim 3, wherein the processing circuitry sets the diagnosis threshold to a smaller value in a case in which accumulated time is longer than or equal to a threshold than in a case in which the accumulated time is shorter than the threshold, and the accumulated time is an integrated value of time during which a temperature increase control for increasing a temperature of an exhaust gas flowing into the exhaust purification device is performed in a period after the starting of the internal combustion engine until the downstream gas temperature becomes higher than or equal to the determination threshold.

5. The controller for the internal combustion engine according to claim 1, wherein the processing circuitry changes a magnitude of the determination threshold in accordance with an index value correlated with a temperature of the exhaust purification device at a time when the starting of the internal combustion engine is completed.

6. The controller for the internal combustion engine according to claim 5, wherein the index value includes a soak time of the internal combustion engine, and the processing circuitry increases the determination threshold as the soak time is reduced.

7. The controller for the internal combustion engine according to claim 5, wherein the index value includes the downstream gas temperature when the starting of the internal combustion engine is completed, and the processing circuitry increases the determination threshold as the downstream gas temperature at the completion of the starting of the internal combustion engine increases.

8. The controller for the internal combustion engine according to claim 1, wherein the processing circuitry executes a cold state determining process that determines whether the internal combustion engine at a time of starting is in a cold state based on of a soak time of the internal combustion engine, and the processing circuitry is configured to execute the anomaly diagnosing process on a condition that it is determined in the cold state determining process that the internal combustion engine at the time of starting is in a cold state.

9. The controller for the internal combustion engine according to claim 8, wherein the processing circuitry is configured to determine that the internal combustion engine at the time of starting is not in a cold state in the cold state determining process when the soak time is shorter than a first predetermined time.

10. The controller for the internal combustion engine according to claim 9, wherein the processing circuitry determines that the internal combustion engine at the time of starting is in a cold state in the cold state determining process when the soak time is longer than a second predetermined time, the second predetermined time being longer than the first predetermined time, the processing circuitry is configured to set a permitting temperature such that the permitting temperature increases as the soak time becomes longer in the cold state determining process in a case in which the soak time is longer than or equal to the first predetermined time and shorter than or equal to the second predetermined time, and the processing circuitry is configured to determine that the internal combustion engine at the time of starting is in a cold state on a condition that the upstream gas temperature is lower than the permitting temperature.

11. The controller for the internal combustion engine according to claim 8, wherein the processing circuitry executes a calculation condition determining process that determines whether a calculation condition is met, the calculation condition including a determination indicating that the internal combustion engine at the time of starting is in a cold state in the cold state determining process, the processing circuitry executes the integrated value calculating process on a condition that the calculation condition is met, and the processing circuitry is configured to, if the calculation condition ceases to be met after being met in one trip from activation to deactivation of a system of the vehicle, not execute, in the one trip, the calculation condition determining process or the integrated value calculating process thereafter, and not execute the anomaly diagnosing process.

12. The controller for the internal combustion engine according to claim 1, wherein the processing circuitry is configured to update the upstream gas temperature and the downstream gas temperature through a gas temperature updating process, and the gas temperature updating process updates the gas temperature to a value equal to a detection value detected by a temperature sensor on a condition that a deviation between the detection value and a previously obtained gas temperature is smaller than a determination value.

13. The controller for the internal combustion engine according to claim 12, wherein in the gas temperature updating process, the processing circuitry uses a first determination value as the determination value until starting of the internal combustion engine is completed, and uses a second determination value as the determination value after the starting of the internal combustion engine is completed, the second determination value being greater than the first determination value.

14. The controller for the internal combustion engine according to claim 1, wherein the processing circuitry is configured to perform a finalizing process, the finalizing process determines whether to finalize, as a valid diagnosis result, a determination result by the anomaly diagnosing process, and outputs a finalized diagnosis result, and the processing circuitry is configured to, when the soak time of the internal combustion engine is shorter than a first predetermined time, not finalize, as a valid diagnosis result, the determination result by the anomaly diagnosing process in the finalizing process, and thus not output a diagnosis result.

15. The controller for the internal combustion engine according to claim 14, wherein when the soak time is longer than a second predetermined time, which is longer than the first predetermined time, the processing circuitry finalizes, as a valid diagnosis result, the determination result by the anomaly diagnosing process in the finalizing process, and outputs the diagnosis result, and the processing circuitry is configured to, when the soak time is longer than or equal to the first predetermined time and shorter than or equal to the second predetermined time, set a permitting temperature such that the permitting temperature increases as the soak time becomes longer in the finalizing process, finalize, as a valid diagnosis result, the determination result by the anomaly diagnosing process in the finalizing process on a condition that an outside air temperature estimated value is less than the permitting temperature, the outside air temperature estimated value being based on an intake air temperature obtained when an obtaining condition is met through traveling of the vehicle, and output the diagnosis result.

16. A control method for an internal combustion engine, the control method being performed for the internal combustion engine mounted on a vehicle by processing circuitry, the control method comprising:

repeatedly obtaining an upstream gas temperature that indicates a temperature of exhaust gas upstream of an exhaust purification device in an exhaust passage of the internal combustion engine;

repeatedly obtaining a downstream gas temperature that indicates a temperature of exhaust gas downstream of the exhaust purification device in the exhaust passage;

calculating an upstream integrated value that is an integrated value of a difference obtained by subtracting the upstream gas temperature at a starting point in time of integration from the upstream gas temperature after starting of the internal combustion engine;

calculating a downstream integrated value that is an integrated value of a difference obtained by subtracting the downstream gas temperature at the starting point in time of the integration from the downstream gas temperature after the starting of the internal combustion engine; and obtaining an anomaly determination result indicating that the exhaust purification device is in a removed state when a deviation between the upstream integrated value and the downstream integrated value, taken over a range ending when the downstream gas temperature becomes higher than or equal to a determination threshold, after a time since the starting of the internal combustion engine is smaller than a reference level, the determination threshold being higher than a dew point.

17. A non-transitory computer readable memory medium that stores a program that causes processing circuitry to execute a control process for an internal combustion engine, the control process being executed for the internal combustion engine mounted on a vehicle, the control process comprising:

repeatedly obtaining an upstream gas temperature that indicates a temperature of exhaust gas upstream of an exhaust purification device in an exhaust passage of the internal combustion engine;

repeatedly obtaining a downstream gas temperature that indicates a temperature of exhaust gas downstream of the exhaust purification device in the exhaust passage;

calculating an upstream integrated value that is an integrated value of a difference obtained by subtracting the upstream gas temperature at a starting point in time of integration from the upstream gas temperature after starting of the internal combustion engine;

calculating a downstream integrated value that is an integrated value of a difference obtained by subtracting the downstream gas temperature at the starting point in time of the integration from the downstream gas temperature after the starting of the internal combustion engine; and obtaining an anomaly determination result indicating that the exhaust purification device is in a removed state when a deviation between the upstream integrated value and the downstream integrated value, taken over a range ending when the downstream gas temperature becomes higher than or equal to a determination threshold, after a time since the starting of the internal combustion engine is smaller than a reference level, the determination threshold being higher than a dew point.

* * * * *